(12) United States Patent
Tie et al.

(10) Patent No.: US 11,178,682 B2
(45) Date of Patent: Nov. 16, 2021

(54) METHOD FOR REQUESTING UPLINK TRANSMISSION RESOURCE, TERMINAL, AND NETWORK DEVICE

(71) Applicant: HUAWEI TECHNOLOGIES CO., LTD., Guangdong (CN)

(72) Inventors: Xiaolei Tie, Shanghai (CN); Jun Li, Shanghai (CN); Zhihu Luo, Beijing (CN)

(73) Assignee: Huawei Technologies Co., Ltd., Guangdong (CN)

(*) Notice: Subject to any disclaimer, the term of this patent is extended or adjusted under 35 U.S.C. 154(b) by 20 days.

(21) Appl. No.: 16/674,229

(22) Filed: Nov. 5, 2019

(65) Prior Publication Data

US 2020/0077426 A1 Mar. 5, 2020

Related U.S. Application Data

(63) Continuation of application No. PCT/CN2017/083353, filed on May 5, 2017.

(51) Int. Cl.
*H04W 72/12* (2009.01)
*H04W 4/80* (2018.01)
(Continued)

(52) U.S. Cl.
CPC ....... *H04W 72/1268* (2013.01); *H04L 5/0055* (2013.01); *H04W 4/80* (2018.02);
(Continued)

(58) Field of Classification Search
None
See application file for complete search history.

(56) References Cited

U.S. PATENT DOCUMENTS

2013/0235768 A1* 9/2013 Earnshaw ............... H04L 5/006
370/280
2015/0326484 A1 11/2015 Cao et al.
(Continued)

FOREIGN PATENT DOCUMENTS

CN 102917401 A 2/2013
CN 106465371 A 2/2017
(Continued)

OTHER PUBLICATIONS

LG Electronics, "Scheduling request by dedicated physical channel in NB-IoT," 3GPP TSG RAN WG1 Meeting #88bis, R1-1704848; Spokane, USA, XP51242983, Apr. 3-7, 2017, 2 pages.
(Continued)

*Primary Examiner* — Anh Vu H Ly
(74) *Attorney, Agent, or Firm* — Fish & Richardson P.C.

(57) ABSTRACT

Example uplink transmission resource requesting methods and apparatus are described. One example method includes a terminal determines that a collision occurs when the terminal sends a first request to a network device, where the first request is used to request the network device to schedule an uplink transmission resource for the terminal. The terminal adjusts a manner of sending the first request according to a preset rule. In embodiments of this application, the terminal may request the uplink transmission resource from the network device by using the first request.

14 Claims, 5 Drawing Sheets

(51) Int. Cl.
- *H04L 5/00* (2006.01)
- *H04W 16/14* (2009.01)
- *H04W 28/02* (2009.01)
- *H04W 72/04* (2009.01)
- *H04W 72/14* (2009.01)
- *H04W 74/08* (2009.01)

(52) U.S. Cl.
CPC ....... *H04W 16/14* (2013.01); *H04W 28/0278* (2013.01); *H04W 72/0406* (2013.01); *H04W 72/14* (2013.01); *H04W 74/0858* (2013.01)

(56) References Cited

U.S. PATENT DOCUMENTS

| | | | |
|---|---|---|---|
| 2018/0049230 A1* | 2/2018 | Moradi | H04W 72/1231 |
| 2018/0167936 A1 | 6/2018 | Quan et al. | |
| 2018/0279324 A1* | 9/2018 | Wang | H04L 1/1861 |
| 2018/0324787 A1* | 11/2018 | Yin | H04L 1/1861 |

FOREIGN PATENT DOCUMENTS

| | | |
|---|---|---|
| WO | 2016134667 A1 | 9/2016 |
| WO | 2016186401 A1 | 11/2016 |
| WO | 2016186698 A1 | 11/2016 |
| WO | 2017024564 A1 | 2/2017 |

OTHER PUBLICATIONS

Extended European Search Report issued in European Application No. 17908380.3 dated Mar. 20, 2020, 11 pages.
Nokia et al., "Scheduling Request Multiplexing with ACK / NACK", 3GPP TSG-RAN WG1 Meeting # 86 R1-166593, Gothenburg, Sweden, Aug. 22-26, 2016, 2 pages.
Ericsson, "NB-IoT-UL Design", 3GPP TSG-RAN WG1 # 83 R1-157423, Anaheim, California, USA, Nov. 15-22, 2015, 7 pages.
Mediatek Inc., "Latency Analysis for NR Frame Structure", 3GPP TSG RAN WG1 Meeting # 86 R1-167521 , Gothenburg, Sweden, Aug. 22-26, 2016, 6 pages.
PCT International Search Report and Written Opinion in International Application No. PCT/CN2017/083,353, dated Jan. 29, 2018, 15 pages (With English Translation).
Ericsson, "Physical layer scheduling request for NB-IoT," 3GPP TSG RAN#88bis, R1-1705183, Spokane, USA, Apr. 3-7, 2017, 3 pages.
Office Action issued in Chinese Application No. 201780090327.4 dated Nov. 3, 2020.
Office Action issued in Chinese Application No. 201780090327.4 dated Apr. 14, 2021, 18 pages (with English translation).
Nokia, Alcatel-Lucent Shanghai Bell, "Support for physical layer SR," 3GPP TSG RAN WG1 Meeting #88bis, R1-1705044, Spokane, USA, Apr. 3-7, 2017, 3 pages.
Samsung, "Discussion on scheduling request for NB-IoT," 3GPP TSG RAN WG1 Meeting #88bis, R1-1705310, Spokane, U.S.A., Apr. 3-7, 2017, 2 pages.

* cited by examiner

METHOD FOR REQUESTING UPLINK TRANSMISSION RESOURCE, TERMINAL, AND NETWORK DEVICE

CROSS-REFERENCE TO RELATED APPLICATIONS

This application is a continuation of International Application No. PCT/CN2017/083353, filed on May 5, 2017, the disclosure of which is hereby incorporated by reference in its entirety.

TECHNICAL FIELD

This application relates to the communications field, and more specifically, to a method for requesting an uplink transmission resource, a terminal, and a network device.

BACKGROUND

With advent of an era of smart cities and big data, everything will be connected through wireless communication. Currently, massive connections between things have emerged. Most of these connections between things are implemented by using short-range communications technologies such as Bluetooth and Wi-Fi instead of operators' mobile networks. To meet transmission requirements of different internet of things (internet of things, IoT) services, the 3rd generation partnership project (the 3rd generation partnership project, 3GPP) carries out research on technologies for enhancing functions of mobile communications networks based on characteristics of internet of things services and features of mobile communications networks to adapt to requirements of booming internet of things services.

Cellular-network-based narrowband internet of things (narrow band-IoT, NB-IoT) becomes an important branch of the internet of everything. The NB-IoT is built on a cellular network, consumes a bandwidth of approximately 180 kHz, and may be directly deployed on a global system for mobile communications (global system for mobile communications, GSM) network, a universal mobile telecommunications system (universal mobile telecommunications system, UMTS) network or a long term evolution (long term evolution, LTE) network to reduce deployment costs of the NB-IoT and implement smooth upgrades.

However, in the current NB-IoT, when a terminal needs to send uplink data but does not have an uplink transmission resource, the terminal can only initiate a random access procedure to a network device, to request an uplink transmission resource for transmitting the uplink data from the network device. In other words, even if the terminal is connected to the network device through a random access procedure, when the terminal needs to request an uplink transmission resource from the network device, the terminal can only initiate a random access procedure again to request an uplink transmission resource from the network device. Therefore, the foregoing manner of requesting an uplink transmission resource from the network device through a random access procedure is insufficiently flexible.

SUMMARY

This application provides a method for requesting an uplink transmission resource and a terminal, to improve flexibility of requesting an uplink transmission resource by a terminal in NB-IoT.

According to a first aspect, a method for requesting an uplink transmission resource is provided, including: determining, by a terminal, that a collision occurs when the terminal sends a first request to a network device, where the first request is used to request the network device to schedule an uplink transmission resource for the terminal; and adjusting, by the terminal according to a preset rule, a manner of sending the first request.

In this embodiment of this application, the terminal may request the uplink transmission resource from the network device by using the first request. This avoids a prior-art problem that a terminal can request an uplink transmission resource from a network device only by initiating a random access procedure, and improves flexibility of requesting an uplink transmission resource by the terminal from the network device.

Further, the terminal requests the uplink transmission resource from the network device by using the first request, so that a delay that occurs when the terminal requests an uplink transmission resource through a random access procedure is reduced to some extent. This prevents the terminal from failing to request an uplink transmission resource due to a failure in initiating a random access procedure by the terminal. This helps improve efficiency of requesting an uplink transmission resource by the terminal.

Finally, the terminal adjusts, according to the preset rule, the manner of sending the first request, to avoid a collision that occurs when the terminal sends the first request.

Optionally, the first request is a scheduling request (SR) or a buffer status report (BSR).

Optionally, the determining, by a terminal, that a collision occurs when the terminal sends a first request to a network device includes: determining, by the terminal, that the terminal is receiving or sending other data of the terminal when the first request is about to be sent.

With reference to the first aspect, in some possible implementations, the determining, by the terminal, that the terminal is receiving or sending other data of the terminal when the first request is about to be sent includes: determining, by the terminal, that the terminal is performing detection on a search space when the first request is about to be sent; or determining, by the terminal, that the terminal is sending a narrowband physical uplink shared channel (NPUSCH) to the network device when the first request is about to be sent; or determining, by the terminal, that when the first request is about to be sent, the terminal is receiving a narrowband physical downlink shared channel (NPDSCH) sent by the network device; or determining, by the terminal, that the terminal is sending a random access signal to the network device when the first request is about to be sent.

With reference to the first aspect, in some possible implementations, if the terminal determines that the terminal is performing detection on the search space when the first request is about to be sent, the adjusting, by the terminal according to a preset rule, a manner of sending the first request includes: performing, by the terminal, detection on the search space in a first time period; and sending, by the terminal, the first request to the network device in a second time period, where the first time period is a time period earlier than the second time period.

With reference to the first aspect, in some possible implementations, the first time period is a time period earlier than the second time period, and the performing, by the terminal, detection on the search space includes any one of the following cases: detecting, by the terminal, a downlink grant (DL grant) in the search space; detecting, by the terminal, no control information in the search space; or detecting, by the terminal, an uplink grant (UL grant) in the search space.

Optionally, the terminal may choose to send the first request to the network device on a transmission resource used to transmit the first request, located after a transmission resource of the search space in time domain, and closest to an end time period of the search space.

The terminal selects, as a transmission resource for transmitting the first request, the transmission resource used to transmit the first request and closest to the end time period of the search space. This saves, to some extent, time for requesting an uplink transmission resource by the terminal from the network device by using the first request.

With reference to the first aspect, in some possible implementations, the performing, by the terminal, detection on the search space includes: detecting, by the terminal, a downlink grant (DL grant) in the search space in the first time period; and the sending, by the terminal, the first request to the network device in a second time period includes: sending, by the terminal, an ACK/a NACK and the first request to the network device on a first transmission resource in the second time period, where the first transmission resource is a transmission resource that is used to transmit the ACK/NACK and that is indicated by the DL grant.

With reference to the first aspect, in some possible implementations, if the terminal supports downlink data transmission in a first process and downlink data transmission in a second process, a first DL grant is used to schedule the downlink data transmission in the first process, and a second DL grant is used to schedule the downlink data transmission in the second process, the performing, by the terminal, detection on the search space in a first time period includes: detecting, by the terminal, the first DL grant and the second DL grant in the search space in the first time period; the sending, by the terminal, the first request to the network device in a second time period includes: sending, by the terminal, an ACK/a NACK and the first request to the network device on the second transmission resource in the second time period, where the second transmission resource is a transmission resource that is used to transmit the ACK/NACK in the first process and that is indicated by the first DL grant; and the method further includes: sending, by the terminal, an ACK/a NACK and the first request to the network device on a third transmission resource in the third time period, where the third transmission resource is a transmission resource that is used to transmit the ACK/NACK in the second process and that is indicated by the second DL grant, and the third time period is a time period later than the first time period.

When the terminal detects, in the search space, downlink grants used to schedule two processes, the terminal may send first requests on both transmission resources that are used to transmit ACKs/NACKs in the two processes and that are indicated by the two DL grants, to improve reliability of transmitting the first requests.

Optionally, in an embodiment, if the terminal supports downlink data transmission in a first process and downlink data transmission in a second process, a first DL grant is used to schedule the downlink data transmission in the first process, and a second DL grant is used to schedule the downlink data transmission in the second process, the performing, by the terminal, detection on the search space in a first time period includes: detecting, by the terminal, the first DL grant and the second DL grant in the search space in the first time period; and the sending, by the terminal, the first request to the network device includes: sending, by the terminal, an ACK/a NACK and the first request to the network device on a transmission resource that is used to transmit the ACK/NACK in the first process and that is indicated by the first DL grant.

Optionally, a time-domain location of the transmission resource that is used to transmit the ACK/NACK in the first process and that is indicated by the first DL grant precedes a time-domain location of a transmission resource that is used to transmit an ACK/a NACK in the second process and that is indicated by the second DL grant. Therefore, the terminal may send the first request on the transmission resource used to transmit the ACK/NACK in the first process.

A transmission resource used to transmit an ACK/a NACK and closest to a time at which the terminal detects a downlink grant in the search space is selected as a transmission resource for transmitting the first request. This saves, to some extent, time for requesting an uplink transmission resource by the terminal from the network device by using the first request.

With reference to the first aspect, in some possible implementations, if the terminal supports downlink data transmission in a third process and downlink data transmission in a fourth process, a third DL grant is used to schedule the downlink data transmission in the third process, and a fourth DL grant is used to schedule the downlink data transmission in the fourth process, the performing, by the terminal, detection on the search space in a first time period includes: detecting, by the terminal, the third DL grant in the search space in the first time period; and the sending, by the terminal, the first request to the network device in a second time period includes: sending, by the terminal, an ACK/a NACK and the first request to the network device on a fourth transmission resource in the second time period, where the fourth transmission resource is a transmission resource that is used to transmit the ACK/NACK in the third process and that is indicated by the third DL grant.

With reference to the first aspect, in some possible implementations, the transmission resource used to transmit the ACK/NACK in the third process and indicated by the third DL grant is pre-agreed to be used for transmitting the first request.

The terminal and the network device pre-agree that a transmission resource that can be used to transmit the first request is the transmission resource used to transmit the ACK/NACK in the third process. This helps reduce overheads resulting from transmission of the first request.

With reference to the first aspect, in some possible implementations, the method further includes: detecting, by the terminal, the fourth DL grant in the search space, and transmitting, by the terminal, the first request by using a transmission resource that is located after the search space in time domain.

With reference to the first aspect, in some possible implementations, the performing, by the terminal, detection on the search space in a first time period includes: detecting, by the terminal, an uplink grant (UL grant) in the search space in the first time period; and the sending, by the terminal, the first request to the network device in a second time period includes: sending, by the terminal, uplink data on a fifth transmission resource in the second time period, where the uplink data carries the first request, and the fifth transmission resource is a transmission resource that is used to transmit the uplink data and that is indicated by the UL grant.

With reference to the first aspect, in some possible implementations, if the terminal supports uplink data transmission in a first process and uplink data transmission in a second process, a first UL grant is used to schedule the uplink data transmission in the first process, and a second UL grant is used to schedule the uplink data transmission in the second process, the performing, by the terminal, detection on the search space in a first time period includes: detecting, by the terminal, the first UL grant in the search space in the first time period; and the sending, by the terminal, the first request to the network device in a second time period includes: sending, by the terminal, uplink data on a sixth transmission resource in the second time period, where the uplink data carries the first request, and the sixth transmission resource is a transmission resource that is used to transmit the uplink data in the first process and that is indicated by the first UL grant.

With reference to the first aspect, in some possible implementations, the transmission resource used to transmit the uplink data in the first process and indicated by the first UL grant is pre-agreed to be used for transmitting the first request.

The terminal and the network device pre-agree that a transmission resource that can be used to transmit the first request is the transmission resource that is used to transmit the uplink data in the first process and that is scheduled by the first UL grant. This helps reduce overheads resulting from transmission of the first request.

Further, the terminal and the network device pre-agree the transmission resource for transmitting the first request, so that an operation procedure of receiving the first request by the network device is simplified.

With reference to the first aspect, in some possible implementations, the method further includes: detecting, by the terminal, the second UL grant in the search space, and transmitting, by the terminal, the first request by using a transmission resource that is located after the search space in time domain.

With reference to the first aspect, in some possible implementations, if the terminal supports uplink data transmission in a third process and uplink data transmission in a fourth process, a third UL grant is used to schedule the uplink data transmission in the third process, and a fourth UL grant is used to schedule the uplink data transmission in the fourth process, the performing, by the terminal, detection on the search space in a first time period includes: detecting, by the terminal, the third UL grant and the fourth UL grant in the search space in the first time period; the sending, by the terminal, the first request to the network device in a second time period includes: sending, by the terminal, to-be-transmitted uplink data in the third process on a seventh transmission resource in the second time period, where the to-be-transmitted uplink data in the third process carries the first request, and the eighth transmission resource is a transmission resource that is used to transmit the uplink data in the third process and that is indicated by the third UL grant; and the method further includes: sending, by the terminal, to-be-transmitted uplink data in the fourth process on an eighth transmission resource in a fourth time period, where the to-be-transmitted uplink data in the fourth process carries the first request, the eighth transmission resource is a transmission resource that is used to transmit the uplink data in the fourth process and that is indicated by the fourth UL grant, and the fourth time period is a time period later than the first time period.

When the terminal detects, in the search space, uplink grants used to schedule two processes, the terminal may send first requests on both transmission resources that are used to transmit uplink data in the two processes and that are indicated by the two UL grants, to improve reliability of transmitting the first requests.

With reference to the first aspect, in some possible implementations, if the terminal determines that the terminal is sending the NPUSCH to the network device when the first request is about to be sent, the adjusting, by the terminal according to a preset rule, a manner of sending the first request includes: sending, by the terminal, the first request to the network device through the NPUSCH.

With reference to the first aspect, in some possible implementations, if the terminal determines that when the first request is about to be sent, the terminal is receiving the NPDSCH sent by the network device, the adjusting, by the terminal according to a preset rule, a manner of sending the first request includes: receiving, by the terminal in a fifth time period, the NPDSCH sent by the network device; and sending, by the terminal, the first request to the network device in a sixth time period, where the fifth time period is a time period earlier than the sixth time period.

With reference to the first aspect, in some possible implementations, the sending, by the terminal, the first request to the network device in a sixth time period includes: sending, by the terminal, an ACK/a NACK and the first request to the network device on a ninth transmission resource in the sixth time period, where the ninth transmission resource is a transmission resource for transmitting the ACK/NACK used to indicate whether the terminal receives the NPDSCH.

With reference to the first aspect, in some possible implementations, if the terminal supports NPDSCH reception in a fifth process and NPDSCH reception in a sixth process, the receiving, by the terminal in a fifth time period, the NPDSCH sent by the network device includes: receiving, by the terminal in the fifth time period, the NPDSCH transmitted by the network device in the fifth process; and the sending, by the terminal, the first request to the network device in a sixth time period includes: sending, by the terminal, an ACK/a NACK and the first request to the network device on a tenth transmission resource in the sixth time period, where the tenth transmission resource is a transmission resource for transmitting the ACK/NACK used to indicate whether the terminal receives the NPDSCH transmitted in the fifth process.

With reference to the first aspect, in some possible implementations, the transmission resource for the ACK/NACK used to indicate whether the terminal receives the NPDSCH transmitted in the fifth process is pre-agreed to be used for transmitting the first request.

With reference to the first aspect, in some possible implementations, if the terminal supports NPDSCH reception in a fifth process and NPDSCH reception in a sixth process, the receiving, by the terminal in a fifth time period, the NPDSCH sent by the network device includes: receiving, by the terminal in the fifth time period, the NPDSCH transmitted by the network device in the sixth process; and the sending, by the terminal, the first request to the network device in a sixth time period includes: sending, by the terminal in the sixth time period, an ACK/a NACK and the first request to the network device on a target transmission resource for transmitting the ACK/NACK, where the target transmission resource for the ACK/NACK is a transmission resource, with an earlier time-domain location, of a transmission resource for an ACK/a NACK used to indicate whether the terminal receives the NPDSCH in the fifth process and a transmission resource for an ACK/a NACK used to indicate whether the terminal receives the NPDSCH in the sixth process.

The terminal may select, from the transmission resource for the ACK/NACK in the fifth process and the transmission resource for the ACK/NACK in the sixth process as the target transmission resource, a transmission resource closest to a time period in which the terminal is to send the first request, and transmit the first request while transmitting the ACK/NACK. This saves, to some extent, time for requesting an uplink transmission resource by the terminal from the network device by using the first request.

With reference to the first aspect, in some possible implementations, the ACK/NACK and the first request are modulated by using $$\frac{\pi}{4} QPSK.$$

With reference to the first aspect, in some possible implementations, the terminal determines that the terminal is sending the random access signal to the network device when the first request is about to be sent; and the adjusting, by the terminal according to a preset rule, a manner of sending the first request includes: sending, by the terminal, the random access signal to the network device in a seventh time period; and sending, by the terminal, the first request to the network device in an eighth time period, where the seventh time period is a time period earlier than the eighth time period, or the seventh time period and the eighth time period are a same time period.

With reference to the first aspect, in some possible implementations, the terminal determines that the terminal is sending the random access signal to the network device when the first request is about to be sent; and the adjusting, by the terminal according to a preset rule, a manner of sending the first request includes: sending, by the terminal, the random access signal to the network device on a transmission resource in a first area or a second area, where sending the random access signal on a transmission resource in the first area is used to instruct the terminal to send the first request to the network device, or sending the random access signal on a transmission resource in the second area is used to instruct the terminal not to send the first request to the network device.

The terminal sends random access signals to the network device in different areas, to implicitly indicate whether the terminal needs to transmit to-be-transmitted uplink data. This can reduce, to some extent, signaling overheads generated when the terminal sends the first request.

According to a second aspect, a method for requesting an uplink transmission resource is provided, including: determining, by a terminal, a dedicated transmission resource used to transmit a scheduling request (SR); and sending, by the terminal, the SR to a network device on the dedicated transmission resource.

In this embodiment of this application, the terminal sends the SR to the network device on the dedicated transmission resource used to transmit an SR, to request an uplink transmission resource. This avoids a prior-art problem that a terminal can request an uplink transmission resource from a network device only by initiating a random access procedure, and improves flexibility of requesting an uplink transmission resource by the terminal from the network device.

Further, the terminal sends the SR to the network device to request an uplink transmission resource, so that a delay that occurs when the terminal requests an uplink transmission resource through a random access procedure is reduced to some extent. This prevents the terminal from failing to request an uplink transmission resource due to a failure in initiating a random access procedure by the terminal. This helps improve efficiency of requesting an uplink transmission resource by the terminal.

Finally, the terminal sends the SR to the network device on the dedicated transmission resource used to transmit an SR, to avoid a collision between sending the SR by the terminal to the network device and another terminal behavior to be performed by the terminal.

With reference to the second aspect, in some possible implementations, the method further includes: determining, by the terminal, a target channel coding scheme based on a data volume of to-be-transmitted data; and performing, by the terminal, channel coding on the SR by using the target channel coding scheme.

The channel coding scheme for the SR is used to indicate a data volume range of a data volume of to-be-transmitted data of the terminal, so that when using the SR to indicate to the network device that the terminal has to-be-transmitted uplink data, the terminal further uses the SR to indicate a data volume range of a data volume of the to-be-transmitted uplink data. This simplifies, to some extent, a procedure of requesting an uplink transmission resource by the terminal.

With reference to the second aspect, in some possible implementations, the determining, by the terminal, a target channel coding scheme based on a data volume of to-be-transmitted data includes: determining, by the terminal, a data volume range into which the data volume of to-be-transmitted data falls; and determining, by the terminal, the target channel coding scheme based on the data volume range into which the data volume of to-be-transmitted data falls and a mapping relationship between a data volume range and a channel coding scheme.

With reference to the second aspect, in some possible implementations, different data volume ranges correspond to different channel coding schemes in the mapping relationship between a data volume range and a channel coding scheme.

With reference to the second aspect, in some possible implementations, the target channel coding scheme includes an orthogonal coding scheme, and the performing, by the terminal, channel coding on the SR by using the target channel coding scheme includes: performing, by the terminal, channel coding on the SR by using the orthogonal coding scheme.

According to a third aspect, a method for requesting an uplink transmission resource is provided, including: determining, by a network device, a dedicated transmission resource used to transmit a scheduling request (SR); and receiving, by the network device on the dedicated transmission resource, the SR sent by the terminal.

In this embodiment of this application, the terminal sends the SR to the network device on the dedicated transmission resource used to transmit an SR, to request an uplink transmission resource. This avoids a prior-art problem that a terminal can request an uplink transmission resource from a network device only by initiating a random access procedure, and improves flexibility of requesting an uplink transmission resource by the terminal from the network device.

Further, the terminal sends the SR to the network device to request an uplink transmission resource, so that a delay that occurs when the terminal requests an uplink transmission resource through a random access procedure is reduced to some extent. This prevents the terminal from failing to request an uplink transmission resource due to a failure in initiating a random access procedure by the terminal. This helps improve efficiency of requesting an uplink transmission resource by the terminal.

Finally, the terminal sends the SR to the network device on the dedicated transmission resource used to transmit an SR, to avoid a collision between sending the SR by the terminal to the network device and another terminal behavior to be performed by the terminal.

With reference to the third aspect, in some possible implementations, the method further includes: determining, by the network device based on a target channel coding scheme for the SR and a mapping relationship between a data volume range and a channel coding scheme, a data volume range into which a data volume of to-be-transmitted data of the terminal falls.

With reference to the third aspect, in some possible implementations, different data volume ranges correspond to different channel coding schemes in the mapping relationship between a data volume range and a channel coding scheme.

The channel coding scheme for the SR is used to indicate a data volume range of a data volume of to-be-transmitted data of the terminal, so that when using the SR to indicate to the network device that the terminal has to-be-transmitted uplink data, the terminal further uses the SR to indicate a data volume range of a data volume of the to-be-transmitted uplink data. This simplifies, to some extent, a procedure of requesting an uplink transmission resource by the terminal.

According to a fourth aspect, a terminal is provided. The terminal includes units configured to perform the method in the first aspect.

According to a fifth aspect, a terminal is provided. The terminal includes units configured to perform the method in the second aspect.

According to a sixth aspect, a network device is provided. The network device includes units configured to perform the method in the third aspect.

According to a seventh aspect, a terminal is provided. The terminal includes a memory, a processor, an input/output interface, and a transceiver. There is a communication connection between the memory, the processor, the input/output interface, and the transceiver. The memory is configured to store an instruction. The processor is configured to execute the instruction stored in the memory. When the instruction is executed, the processor performs the method in the first aspect by using the transceiver, and controls the input/output interface to receive input data and information and to output data such as an operation result.

According to an eighth aspect, a network device is provided. The network device includes a memory, a processor, an input/output interface, and a transceiver. There is a communication connection between the memory, the processor, the input/output interface, and the transceiver. The memory is configured to store an instruction. The processor is configured to execute the instruction stored in the memory. When the instruction is executed, the processor performs the method in the second aspect by using the transceiver, and controls the input/output interface to receive input data and information and to output data such as an operation result.

According to a ninth aspect, a network device is provided. The network device includes a memory, a processor, an input/output interface, and a transceiver. There is a communication connection between the memory, the processor, the input/output interface, and the transceiver. The memory is configured to store an instruction. The processor is configured to execute the instruction stored in the memory. When the instruction is executed, the processor performs the method in the third aspect by using the transceiver, and controls the input/output interface to receive input data and information and to output data such as an operation result.

According to a tenth aspect, a computer-readable medium is provided. The computer-readable medium stores program code to be executed by a terminal device. The program code includes instructions used to perform the methods in the foregoing aspects.

According to an eleventh aspect, a computer program product including an instruction is provided. When the computer program product runs on a computer, the computer is enabled to perform the methods in the foregoing aspects.

According to a twelfth aspect, a baseband processor is provided. The baseband processor is coupled to a transceiver. The baseband processor is configured to determine that a collision occurs when a first request is sent to a network device, where the first request is used to request the network device to schedule an uplink transmission resource for the terminal. The transceiver is configured to adjust, according to a preset rule, a manner of sending the first request. The baseband processor may control the transceiver to perform the method in the first aspect.

According to a thirteenth aspect, a baseband processor is provided. The baseband processor is coupled to a transceiver. The baseband processor is configured to determine a dedicated transmission resource used to transmit a scheduling request (SR). The transceiver is configured to send the scheduling request (SR) to a network device on the dedicated transmission resource determined by the processor. The baseband processor may control the transceiver to perform the method in the second aspect.

DESCRIPTION OF EMBODIMENTS

The following describes the technical solutions of this application with reference to the accompanying drawings.

Figure 1:
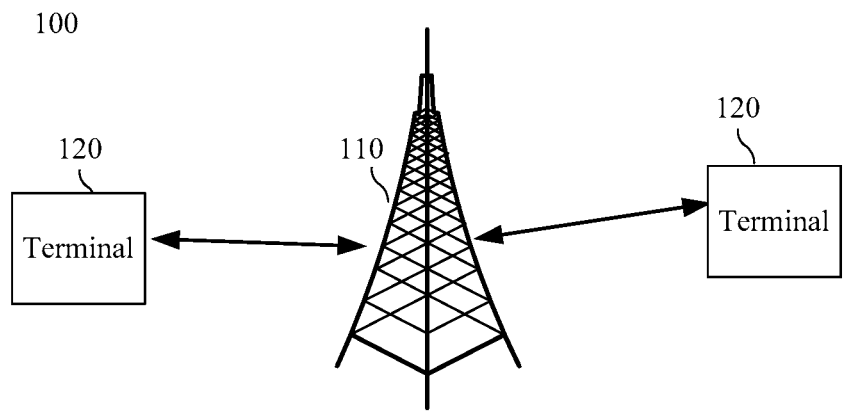
FIG. 1 shows a wireless communications system 100 to which an embodiment of this application is applied.

FIG. 1 shows a wireless communications system 100 to which an embodiment of this application is applied. The wireless communications system 100 may include a network device 110. The network device 110 may be a device that communicates with a terminal device. The network device 110 may provide communication coverage for a specific geographical area, and may communicate with a terminal device within the coverage area.

FIG. 1 shows one network device and two terminals as an example. Optionally, the wireless communications system 100 may include a plurality of network devices, and a coverage range of each network device may include another quantity of terminals. This is not limited in this embodiment of this application.

Optionally, the wireless communications system 100 may further include other network entities such as a network controller and a mobility management entity. This is not limited in this embodiment of this application.

It should be understood that the technical solutions of this application may be applied to various communications systems, for example, a global system for mobile communications (global system for mobile communications n, GSM), a code division multiple access (code division multiple access, CDMA) system, a wideband code division multiple access (wideband code division multiple access, WCDMA) system, a general packet radio service (general packet radio service, GPRS) system, a long term evolution (long term evolution, LTE) system, a long term evolution advanced (long term evolution advanced, LTE-A) system, a universal mobile telecommunications system (universal mobile telecommunication system, UMTS), a new radio (new radio, NR) system, and a 5G system.

It should be further understood that, in this embodiment of this application, the terminal may include but is not limited to a terminal device applied to the internet of things. For example, the terminal may be a terminal device connected to NB-IoT (which may be referred to as an "NB-IoT terminal"): a smart metering device, a logistics tracking device, an environmental monitoring device, or the like. Alternatively, the terminal may include but is not limited to a mobile station (Mobile Station, MS), a mobile terminal (mobile terminal), a mobile phone (mobile phone), user equipment (user equipment, UE), a handset (handset), portable equipment (portable equipment), and the like. The terminal device may communicate with one or more core networks through a radio access network (radio access network, RAN). For example, the terminal device may be a mobile phone (or referred to as a "cellular" phone) or a computer with a wireless communication function. Alternatively, the terminal device may be a portable mobile apparatus, a pocket-sized mobile apparatus, a handheld mobile apparatus, a computer built-in mobile apparatus, or a vehicle-mounted mobile apparatus.

In this embodiment of this application, the network device may be an access network device. For example, the network device may be a base station, a transmission and reception point (transmit and receive point, TRP), or an access point. The base station may be a base transceiver station (base transceiver station, BTS) in GSM or CDMA, or may be a NodeB (NodeB) in WCDMA, or may be an evolved NodeB (evolved Node B, eNB or e-NodeB) in LTE, or may be a gNB in NR or 5G. This is not specifically limited in this embodiment of this application.

Figure 2:
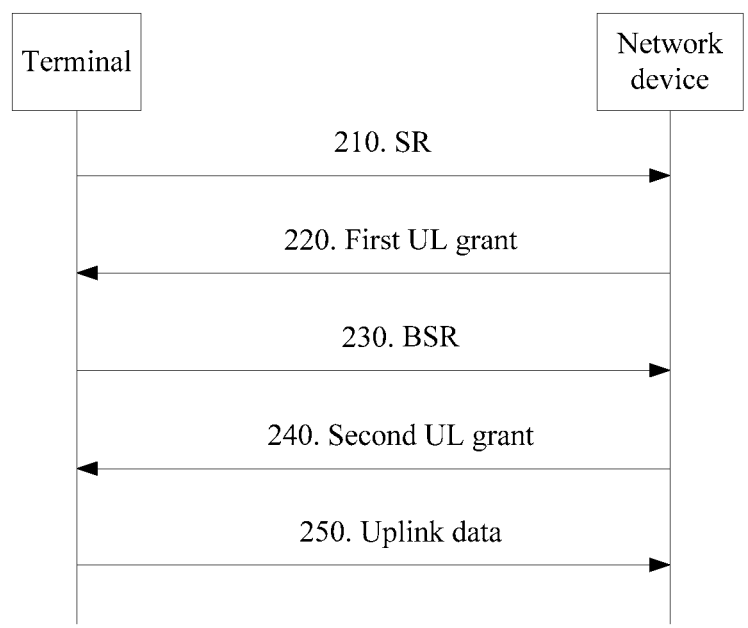
FIG. 2 is a schematic flowchart of a method for requesting an uplink transmission resource according to an embodiment of this application.

In NB-IoT, a scheduling request (scheduling request, SR) mechanism is introduced to a terminal to improve flexibility of requesting an uplink transmission resource by the terminal and avoid a prior-art problem that a terminal can request an uplink transmission resource only by initiating a random access procedure to a network device again. In other words, similar to a method for requesting an uplink transmission resource by a terminal from a network device based on an SR mechanism in an existing LTE communications system, in NB-IoT, the terminal may also request an uplink transmission resource from a network device by using the SR mechanism. With reference to FIG. 2, the following describes in detail the method for requesting an uplink transmission resource by a terminal based on the SR mechanism.

FIG. 2 is a schematic flowchart of a method for requesting an uplink transmission resource according to an embodiment of this application. The method shown in FIG. 2 includes the following steps.

210. A terminal sends an SR to a network device.

Specifically, when the terminal needs to transmit to-be-transmitted uplink data to the network device, the terminal may send an SR to the network device. The SR is used to indicate that the terminal needs to transmit the to-be-transmitted uplink data.

220. The network device sends first uplink grant (uplink grant, UL Grant) information to the terminal.

Specifically, the first uplink grant information is used to indicate a transmission resource used by the terminal to transmit a buffer status report (buffer status report, BSR).

It should be noted that the network device may send the first uplink grant information to the terminal through an NPDCCH, and the transmission resource that is used to transmit the BSR and that is indicated by the first uplink grant information may be a transmission resource corresponding to a narrowband physical uplink shared channel (narrowband physical uplink shared Channel, NPUSCH).

230. The terminal sends the BSR to the network device.

Specifically, the terminal may send the BSR to the network device on the transmission resource indicated by the first uplink grant information. The BSR is used to indicate a data volume of the to-be-transmitted uplink data of the terminal.

240. The network device sends second uplink grant information to the terminal.

Specifically, the network device sends the second uplink grant information to the terminal. The second uplink grant information is used to indicate a transmission resource used to transmit the to-be-transmitted uplink data (where the transmission resource may be referred to as an "uplink transmission resource").

It should be noted that the network device may send the second uplink grant information to the terminal through a narrowband physical downlink control channel (narrowband physical downlink control Channel, NPDCCH), and the transmission resource that is used to transmit the to-be-transmitted uplink data and that is indicated by the second uplink grant information may be a transmission resource corresponding to an NPUSCH.

250. The terminal sends the to-be-transmitted uplink data to the network device.

Specifically, the terminal sends the to-be-transmitted uplink data to the network device on the transmission resource indicated by the second uplink grant information.

It can be learned from the flowchart shown in FIG. 2 that, in NB-IoT, after an SR mechanism is introduced to the terminal, the terminal may request an uplink transmission resource from the network device by using the SR mechanism without a need to request an uplink transmission resource from the network device by initiating a random access procedure any longer. This saves time for requesting an uplink transmission resource by the terminal. In addition, this avoids a collision between a random access procedure initiated by the terminal and a random access procedure initiated by another terminal, to prevent the terminal from failing to request an uplink transmission resource by using the random access procedure. It becomes less probable that the terminal fails to request an uplink transmission resource due to a failure of a random access procedure, but the terminal is more likely to succeed in requesting an uplink transmission resource.

However, in NB-IoT, a terminal is usually a terminal device with low power consumption and low costs, and a capability of the terminal is usually limited:

(1) The terminal cannot simultaneously transmit uplink data and downlink data. The terminal uses a half-duplex communication mode, and may transmit to-be-transmitted data in two directions of a signal carrier but cannot simultaneously perform sending and receiving. To be specific, when receiving an NPDSCH, the terminal has no bandwidth left for sending an NPUSCH.

(2) The terminal cannot send an NPUSCH when performing detection on an NPDCCH by using a search space (Search Space).

(3) The terminal uses a single-carrier frequency-division multiple access (Single-carrier Frequency-Division Multiple Access, SC-FDMA) technology in an uplink direction, and therefore cannot simultaneously send an SR and an NPUSCH to the network device.

The SC-FDMA technology is usually used in the uplink direction to provide the terminal with a relatively low peak-to-average power ratio (Peak-to-Average Power Ratio, PAPR) when the terminal sends an NPUSCH, and extend a service life of a battery of the terminal.

To be specific, in NB-IoT, after the SR mechanism is introduced to the terminal, because the capability of the terminal is limited, if the terminal periodically transmits SRs, sending an SR by the terminal collides with another terminal behavior to be performed by the terminal, for example, sending an SR by the terminal collides with detection on a search space by the terminal, sending an SR by the terminal collides with receiving an NPDSCH by the terminal, or sending an SR by the terminal collides with sending an NPUSCH by the terminal.

Figure 3:
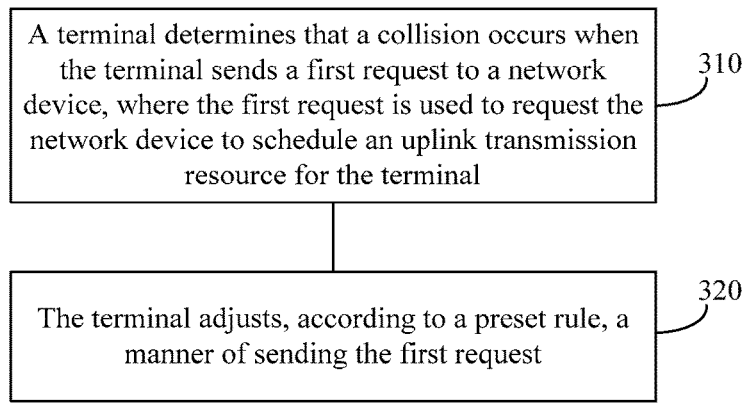
FIG. 3 is a schematic flowchart of a method for requesting an uplink transmission resource according to an embodiment of this application.

To reduce collisions between sending an SR by the terminal and other terminal behaviors to be performed by the terminal, with reference to FIG. 3, the following describes in detail a method for requesting an uplink transmission resource according to an embodiment of this application.

FIG. 3 is a schematic flowchart of a method for requesting an uplink transmission resource according to an embodiment of this application. It should be understood that FIG. 3 shows detailed steps or operations of a communication method, but these steps or operations are merely examples, and other operations or variations of the operations in FIG. 3 may be further performed in this embodiment of this application. In addition, the steps in FIG. 3 may be performed in a sequence different from that shown in FIG. 3, and it may be not necessary to perform all the operations in FIG. 3. The following specifically describes the steps of the method shown in FIG. 3.

310. A terminal determines that a collision occurs when the terminal sends a first request to a network device, where the first request is used to request the network device to schedule an uplink transmission resource for the terminal.

It should be noted that the first request is used by the terminal to request an uplink transmission resource from the network device. For example, the first request may be a scheduling request (SR) or a buffer status report (BSR). The SR is carried in control signaling for transmission, and the BSR may be carried in data for transmission.

Optionally, in an embodiment, the determining, by a terminal, that a collision occurs when the terminal sends a first request to a network device includes: determining, by the terminal, that the terminal is receiving or sending other data of the terminal when the first request is about to be sent.

Specifically, the determining, by the terminal, that the terminal is receiving or sending other data of the terminal when the first request is about to be sent may further include: determining, by the terminal when the first request is to be sent, that the terminal is scheduled by the network device to transmit other data of the terminal. In other words, a collision occurs between a time of transmitting the other data by the terminal and a time of sending the first request by the terminal.

The determining, by the terminal, that the terminal is receiving or sending other data of the terminal when the first request is about to be sent may include: determining, by the terminal when the first request is to be sent, that a transmission resource used by the terminal to send the first request is scheduled to be used for transmitting the other data of the terminal; or may include: determining, by the terminal when the first request is to be sent, that a transmission resource used by the terminal to send the first request is being used to transmit the other data of the terminal. In other words, in this case, the transmission resource for transmitting the first request is occupied by the terminal.

Optionally, the determining, by the terminal, that the terminal is receiving or sending other data of the terminal when the first request is about to be sent includes: determining, by the terminal, that the terminal is performing detection on a search space when the first request is about to be sent; or determining, by the terminal, that the terminal is sending a narrowband physical uplink shared channel (NPUSCH) to the network device when the first request is about to be sent; or determining, by the terminal, that when the first request is about to be sent, the terminal is receiving a narrowband physical downlink shared channel (NPDSCH) sent by the network device; or determining, by the terminal, that the terminal is sending a random access signal to the network device when the first request is about to be sent.

Specifically, the search space may include a common search space and a dedicated search space of a terminal. The common search space is a space that needs to be monitored by all terminals, and is usually used to send a paging message, a random access response (random access response, RAR), a system message, an uplink power control message of the terminal, and the like. In other words, scheduling information of such information is mapped to the common search space. The dedicated search space of the terminal means that information of the terminal does not need to be monitored by all the terminals. In other words, scheduling information of such information is mapped to the dedicated search space of the terminal. Scheduling information of at least one terminal device is mapped to the dedicated search space. A resource in the dedicated search space may be repeatedly used for scheduling information of a plurality of terminal devices. The dedicated search space may include a plurality of control channel elements (control channel element) CCEs. The plurality of CCEs are used to carry control information or the scheduling information of the at least one terminal device. When there are a plurality of terminal devices, CCEs that carry control information or scheduling information of at least two terminal devices may be the same or different.

The sending an NPUSCH to the network device may be: sending an uplink signal (for example, uplink data) to the network device through the NPUSCH.

The receiving an NPDSCH sent by the network device may be: receiving, through the NPDSCH, a downlink signal (for example, downlink data) sent by the network device.

The sending a random access signal to the network device may be: sending, by the terminal, the random access signal to the network device through a narrowband physical random access channel (narrowband physical random access channel, NPRACH).

320. The terminal adjusts, according to a preset rule, a manner of sending the first request.

Specifically, when the terminal determines that the collision occurs when the terminal sends the first request to the network device, the terminal may adjust, according to the preset rule, the manner of sending the first request, to avoid the collision that occurs when the terminal sends the first request. The preset rule may indicate the manner of sending the first request.

It should be noted that the manner of sending the first request may include a coding scheme for the first request, a time for sending the first request, a transmission resource for the first request, or the like. This is not specifically limited in this embodiment of this application.

Optionally, the preset rule may indicate the time for sending the first request.

For example, priorities for executing different instructions may be configured for the terminal in the preset rule, to adjust the time for sending the first request. The preset rule may indicate that a priority of performing detection on the search space by the terminal is higher than that of sending the first request by the terminal. If the terminal determines that detection on the search space collides with sending the first request by the terminal to the network device, the terminal may first perform detection on the search space and then send the first request to the network device. The preset rule may indicate that a priority of sending the NPUSCH by the terminal to the network device is higher than that of sending the first request by the terminal. If the terminal determines that sending the NPUSCH collides with sending the first request by the terminal to the network device, the terminal may first send the NPUSCH and then send the first request to the network device. The preset rule may indicate that a priority of receiving, by the terminal, the NPDSCH sent by the network device is higher than that of sending the first request by the terminal. If the terminal determines that receiving the NPDSCH collides with sending the first request by the terminal to the network device, the terminal may first receive the NPDSCH and then send the first request to the network device. The preset rule may indicate that a priority of sending the random access signal by the terminal to the network device is higher than that of sending the first request by the terminal. If the terminal determines that sending the random access signal collides with sending the first request by the terminal to the network device, the terminal may first send the random access signal and then send the first request to the network device.

In this embodiment of this application, the terminal may request an uplink transmission resource from the network device by using the first request. This avoids a prior-art problem that a terminal can request an uplink transmission resource from a network device only by initiating a random access procedure, and improves flexibility of requesting an uplink transmission resource by the terminal from the network device.

Further, the terminal requests the uplink transmission resource from the network device by using the first request, so that a delay that occurs when the terminal requests an uplink transmission resource through a random access procedure is reduced to some extent. This prevents the terminal from failing to request an uplink transmission resource due to a failure in initiating a random access procedure by the terminal. This helps improve efficiency of requesting an uplink transmission resource by the terminal.

Finally, the terminal adjusts, according to the preset rule, the manner of sending the first request, to avoid a collision that occurs when the terminal sends the first request.

Optionally, if the terminal determines that the terminal is performing detection on the search space when the first request is about to be sent, the adjusting, by the terminal according to a preset rule, a manner of sending the first request includes: performing, by the terminal, detection on the search space in a first time period; and sending, by the terminal, the first request to the network device in a second time period, where the first time period is a time period earlier than the second time period.

Specifically, the first time period is a time period earlier than the second time period, and the terminal may first perform detection on the search space, and then send the first request to the network device after the detection on the search space is completed. In other words, the terminal may send the first request on a transmission resource that is used to transmit the first request and that is located after the search space.

For example, if indicating an SR by the terminal to the network device collides with detection on a common search space (common search space, CSS) by the terminal to obtain an uplink synchronization message (Msg2), a priority of detection on the CSS by the terminal is higher than that of indicating the SR by the terminal to the network device. A BSR may be sent in a third message (Msg3) in a random access procedure.

Optionally, the terminal may choose to send the first request to the network device on a transmission resource used to transmit the first request, located after a transmission resource of the search space in time domain, and closest to an end time period of the search space.

The terminal selects, as a transmission resource for transmitting the first request, the transmission resource used to transmit the first request and closest to the end time period of the search space. This saves, to some extent, time for requesting an uplink transmission resource by the terminal from the network device by using the first request.

Optionally, the first time period is a time period earlier than the second time period, and the performing, by the terminal, detection on the search space includes any one of the following cases: detecting, by the terminal, a downlink grant (DL grant) in the search space; detecting, by the terminal, no control information in the search space; or detecting, by the terminal, an uplink grant (UL grant) in the search space.

Specifically, regardless of whether the terminal detects control information (for example, a DL grant or an UL grant) in the search space, the terminal can send the first request to the network device on the transmission resource that is located after the search space.

Optionally, in an embodiment, the performing, by the terminal, detection on the search space in a first time period includes: detecting, by the terminal, a downlink grant (DL grant) in the search space; and the sending, by the terminal, the first request to the network device in a second time period includes: sending, by the terminal, an ACK/a NACK and the SR to the network device on a first transmission resource in the second time period, where the first transmission resource is a transmission resource that is used to transmit the ACK/NACK and that is indicated by the DL grant.

Specifically, the terminal may transmit the first request on the transmission resource that is used to transmit the ACK/NACK and that is indicated by the DL grant.

It should be noted that the terminal may be a terminal supporting a single process (for example, a HARQ process); or may be a terminal supporting dual processes, where the supporting dual processes may mean that the terminal can transmit data in two processes concurrently; or may be a terminal supporting a plurality of processes, that is, two processes described in the following may be any two of the plurality of processes supported by the terminal. The following uses an example in which the terminal supports two processes to describe the method for requesting an uplink transmission resource in this embodiment of this application when sending the first request by the terminal to the network device collides with detection on the search space by the terminal.

Optionally, in an embodiment, if the terminal supports downlink data transmission in a first process and downlink data transmission in a second process, a first DL grant is used to schedule the downlink data transmission in the first process, and a second DL grant is used to schedule the downlink data transmission in the second process, the performing, by the terminal, detection on the search space in a first time period includes: detecting, by the terminal, the first DL grant and the second DL grant in the search space in the first time period; the sending, by the terminal, the first request to the network device in a second time period includes: sending, by the terminal, an ACK/a NACK and the first request to the network device on the second transmission resource in the second time period, where the second transmission resource is a transmission resource that is used to transmit the ACK/NACK in the first process and that is indicated by the first DL grant; and the method further includes: sending, by the terminal, an ACK/a NACK and the first request to the network device on a third transmission resource in the third time period, where the third transmission resource is a transmission resource that is used to transmit the ACK/NACK in the second process and that is indicated by the second DL grant, and the third time period is a time period later than the first time period.

Specifically, if the terminal detects, in the search space, downlink grants (the first DL grant and the second DL grant) used to schedule two processes, the terminal may send first requests on both transmission resources that are used to transmit ACKs/NACKs in the two processes and that are indicated by the two DL grants.

When the terminal detects, in the search space, downlink grants used to schedule two processes, the terminal may send first requests on both transmission resources that are used to transmit ACKs/NACKs in the two processes and that are indicated by the two DL grants, to improve reliability of transmitting the first requests.

Optionally, in an embodiment, if the terminal supports downlink data transmission in a first process and downlink data transmission in a second process, a first DL grant is used to schedule the downlink data transmission in the first process, and a second DL grant is used to schedule the downlink data transmission in the second process, the performing, by the terminal, detection on the search space in a first time period includes: detecting, by the terminal, the first DL grant and the second DL grant in the search space in the first time period; and the sending, by the terminal, the first request to the network device includes: sending, by the terminal, an ACK/a NACK and the first request to the network device on a transmission resource that is used to transmit the ACK/NACK in the first process and that is indicated by the first DL grant.

Specifically, if the terminal detects, in the search space, DL grants (the first DL grant and the second DL grant) used to schedule two processes, the terminal may send the first request on a transmission resource for an ACK/a NACK in either of the two processes (for example, the process may be the foregoing first process).

Optionally, a time-domain location of the transmission resource that is used to transmit the ACK/NACK in the first process and that is indicated by the first DL grant precedes a time-domain location of a transmission resource that is used to transmit an ACK/a NACK in the second process and that is indicated by the second DL grant. Therefore, the terminal may send the first request on the transmission resource used to transmit the ACK/NACK in the first process.

A transmission resource used to transmit an ACK/a NACK and closest to a time at which the terminal detects a downlink grant in the search space is selected as a transmission resource for transmitting the first request. This saves, to some extent, time for requesting an uplink transmission resource by the terminal from the network device by using the first request.

Figure 4:
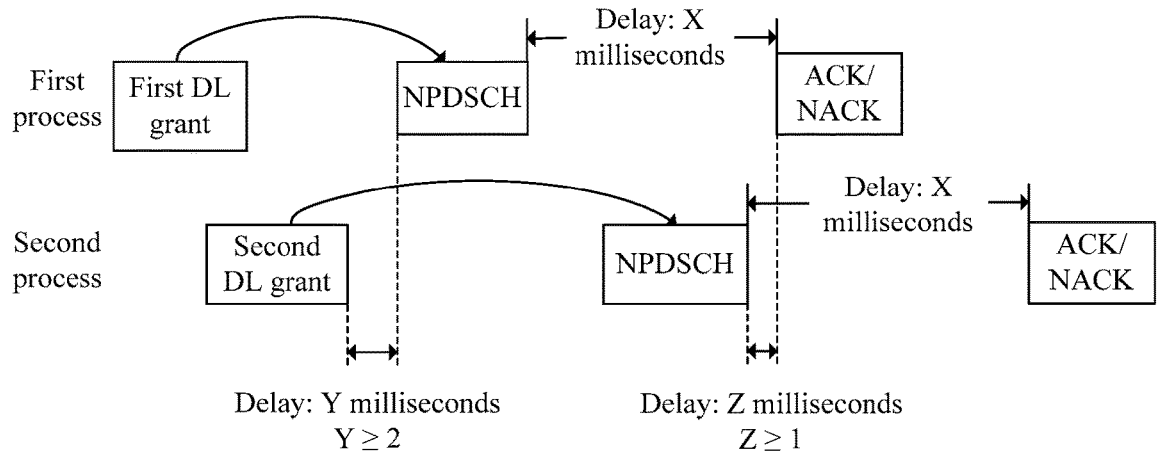
FIG. 4 is a schematic diagram of a method for requesting an uplink transmission resource according to an embodiment of this application.

For example, FIG. 4 is a schematic diagram of a method for requesting an uplink transmission resource according to an embodiment of this application. It can be learned from the method shown in FIG. 4 that a terminal supports receiving, in a first process, of an NPDSCH sent by a network device, and receiving, in a second process, of an NPDSCH sent by the network device. When the terminal is performing detection on a search space, if the terminal detects both a first DL grant used to schedule the NPDSCH in the first process and a second DL grant used to schedule the NPDCH in the second process, the terminal may determine, based on the first DL grant, a transmission resource used to feed back an ACK/a NACK to the network device in the first process; the terminal may further determine, based on the second DL grant, a transmission resource used to feed back an ACK/a NACK to the network device in the second process; and the terminal may select, as a transmission resource for the terminal to send an SR, a transmission resource, with an earlier time, of the transmission resources used to feed back the ACKs/NACKs in the first process and the second process, namely, the transmission resource used to feed back the ACK/NACK in the first process in FIG. 4.

Optionally, the transmission resource used to transmit the ACK/NACK in the first process and indicated by the first DL grant is pre-agreed to be used for transmitting the first request.

Specifically, the transmission resource that is used to transmit the ACK/NACK in the first process and that is scheduled by the first DL grant may be further a transmission resource that can be used to transmit the first request and that is pre-agreed by the terminal and the network device. In other words, the first request can be transmitted only on the transmission resource that is used to transmit the ACK/NACK in the first process and that is scheduled by the first DL grant.

It should be noted that the pre-agreeing by the terminal and the network device may be pre-agreeing by the network device and the terminal by using a protocol, or may be pre-agreeing by the network device and the terminal by using signaling. This is not specifically limited in this embodiment of this application.

The terminal and the network device pre-agree that a transmission resource that can be used to transmit the first request is the transmission resource used to transmit the ACK/NACK in the first process. This helps reduce overheads resulting from transmission of the first request.

Optionally, in an embodiment, if the terminal supports downlink data transmission in a third process and downlink data transmission in a fourth process, a third DL grant is used to schedule the downlink data transmission in the third process, and a fourth DL grant is used to schedule the downlink data transmission in the fourth process, the performing, by the terminal, detection on the search space in a first time period includes: detecting, by the terminal, the third DL grant in the search space in the first time period; and the sending, by the terminal, the first request to the network device in a second time period includes: sending, by the terminal, an ACK/a NACK and the SR to the network device on a fourth transmission resource in the second time period, where the fourth transmission resource is a transmission resource that is used to transmit the ACK/NACK in the third process and that is indicated by the third DL grant.

It should be noted that, for the terminal supporting the downlink data transmission in the third process and the downlink data transmission in the fourth process, if the terminal detects, in the search space, a downlink grant (which may be the aforementioned third DL grant) for either the third process or the fourth process, the terminal may send the first request on a transmission resource that is used to transmit an ACK/a NACK and that is indicated by the downlink grant (the third DL grant).

Optionally, the transmission resource used to transmit the ACK/NACK in the third process and indicated by the third DL grant is pre-agreed to be used for transmitting the first request.

Specifically, the network device and the terminal may agree, by using a communications protocol, that the first request can be sent on the transmission resource for transmitting the ACK/NACK in the third process of the two processes (the third process and the fourth process).

Optionally, the method further includes: detecting, by the terminal, the fourth DL grant in the search space, and transmitting, by the terminal, the first request by using a transmission resource that is located after the search space in time domain.

Specifically, if the terminal detects the fourth DL grant in the search space, and the fourth process scheduled by the fourth DL grant is not a process agreed by the network device and the terminal, after performing detection on the search space, the terminal may transmit the first request on a transmission resource that is used to transmit the first request and that is located after a transmission resource of the search space.

The foregoing mainly describes the method for requesting an uplink transmission resource in this embodiment of this application when the terminal detects a downlink grant in the search space. The following describes in detail the method for requesting an uplink transmission resource in this embodiment of this application when the terminal detects an uplink grant in the search space.

Optionally, in an embodiment, the performing, by the terminal, detection on the search space in a first time period includes: detecting, by the terminal, an uplink grant (UL grant) in the search space in the first time period; and the sending, by the terminal, the first request to the network device in a second time period includes: sending, by the terminal, uplink data on a fifth transmission resource in the second time period, where the uplink data carries the first request, and the fifth transmission resource is a transmission resource indicated by the UL grant.

Specifically, when the terminal detects the uplink grant in the search space, the terminal may send the first request on the transmission resource used to transmit uplink data and indicated by the UL grant. For example, the terminal may add the first request, for example, a BSR medium access control control element (Medium Access Control Control Element, MAC CE), to uplink data.

It should be noted that the terminal may be a terminal supporting a single process (for example, a HARQ process); or may be a terminal supporting dual processes, where the supporting dual processes may mean that the terminal can transmit data in two processes concurrently; or may be a terminal supporting a plurality of processes, that is, two processes described in the following may be any two of the plurality of processes supported by the terminal. The following uses an example in which the terminal supports two processes to describe the method for requesting an uplink transmission resource in this embodiment of this application when sending the first request by the terminal to the network device collides with detection on the search space by the terminal.

Optionally, in an embodiment, if the terminal supports uplink data transmission in a first process and uplink data transmission in a second process, a first UL grant is used to schedule the uplink data transmission in the first process, and a second UL grant is used to schedule the uplink data transmission in the second process, the performing, by the terminal, detection on the search space in a first time period includes: detecting, by the terminal, the first UL grant in the search space in the first time period; and the sending, by the terminal, the first request to the network device in a second time period includes: sending, by the terminal, uplink data on a sixth transmission resource in the second time period, where the uplink data carries the first request, and the sixth transmission resource is a transmission resource that is used to transmit the uplink data in the first process and that is indicated by the first UL grant.

Specifically, when the terminal supports the uplink data transmission in the first process and the uplink data transmission in the second process, if the terminal detects, in the search space, either (for example, the first UL grant) of the uplink grants used to schedule the two processes, the terminal may send the first request on the transmission resource that is used to transmit the uplink data and that is indicated by the first UL grant.

Optionally, the transmission resource used to transmit the uplink data in the first process and indicated by the first UL grant is pre-agreed to be used for transmitting the first request.

Specifically, the first process scheduled by the first UL grant may be further a process that can be used to transmit the first request and that is pre-agreed by the terminal and the network device. In other words, the first request can be transmitted only on the transmission resource that is used to transmit the uplink data in the first process and that is scheduled by the first UL grant.

It should be noted that the pre-agreeing by the terminal and the network device may be pre-agreeing by the network device and the terminal by using a protocol, or may be pre-agreeing by the network device and the terminal by using signaling. This is not specifically limited in this embodiment of this application.

The terminal and the network device pre-agree that a transmission resource that can be used to transmit the first request is the transmission resource that is used to transmit the uplink data in the first process and that is scheduled by the first UL grant. This helps reduce overheads resulting from transmission of the first request.

Further, the terminal and the network device pre-agree the transmission resource for transmitting the first request, so that an operation procedure of receiving the first request by the network device is simplified.

Optionally, in an embodiment, the method further includes: detecting, by the terminal, the second UL grant in the search space, and transmitting, by the terminal, the first request by using a transmission resource that is located after the search space in time domain.

Specifically, if the terminal detects the second UL grant in the search space, and the second process scheduled by the second UL grant is not a process agreed by the network device and the terminal, after performing detection on the search space, the terminal may transmit the first request on a transmission resource that is used to transmit the first request and that is located after a transmission resource of the search space.

Optionally, in an embodiment, if the terminal supports uplink data transmission in a third process and uplink data transmission in a fourth process, a third UL grant is used to schedule the uplink data transmission in the third process, and a fourth UL grant is used to schedule the uplink data transmission in the fourth process, the performing, by the terminal, detection on the search space in a first time period includes: detecting, by the terminal, the third UL grant and the fourth UL grant in the search space in the first time period; and sending, by the terminal, to-be-transmitted uplink data in the third process on a seventh transmission resource, where the to-be-transmitted uplink data in the third process carries the first request, and the seventh transmission resource is a transmission resource that is used to transmit the uplink data in the third process and that is indicated by the third UL grant; and the method further includes: sending, by the terminal, to-be-transmitted uplink data in the fourth process on an eighth transmission resource in a fourth time period, where the to-be-transmitted uplink data in the fourth process carries the first request, the eighth transmission resource is a transmission resource that is used to transmit the uplink data in the fourth process and that is indicated by the fourth UL grant, and the fourth time period is a time period later than the first time period.

Specifically, if the terminal detects, in the search space, uplink grants (the third UL grant and the fourth UL grant) used to schedule two processes, the terminal may send first requests on both transmission resources that are used to transmit uplink data in the two processes and that are indicated by the two UL grants.

When the terminal detects, in the search space, uplink grants used to schedule two processes, the terminal may send first requests on both transmission resources that are used to transmit uplink data in the two processes and that are indicated by the two UL grants, to improve reliability of transmitting the first requests.

Optionally, in an embodiment, if the terminal supports uplink data transmission in a third process and uplink data transmission in a fourth process, a third UL grant is used to schedule the uplink data transmission in the third process, and a fourth UL grant is used to schedule the uplink data transmission in the fourth process, the performing, by the terminal, detection on the search space in a first time period includes: detecting, by the terminal, the third UL grant and the fourth UL grant in the search space in the first time period; and the sending, by the terminal, the first request to the network device in a second time period includes: sending, by the terminal in the second time period, to-be-transmitted uplink data in the third process to the network device on a transmission resource used to transmit uplink data and indicated by the third UL grant, where the to-be-transmitted uplink data in the third process carries the first request.

Specifically, if the terminal detects, in the search space, UL grants (the first UL grant and the second UL grant) used to schedule two processes, the terminal may send the first request on a transmission resource that is in either (for example, the third process) of the two processes and that is used to transmit the to-be-transmitted uplink data in the third process.

Optionally, a time-domain location of the transmission resource that is used to transmit the uplink data in the third process and that is indicated by the third UL grant precedes a time-domain location of a transmission resource that is used to transmit the uplink data in the fourth process and that is indicated by the fourth UL grant. Therefore, the terminal may send the first request on the transmission resource that is used to transmit the uplink data in the third process and that is scheduled by the third UL grant.

A transmission resource used to transmit uplink data and closest to a time at which the terminal detects an uplink grant in the search space is selected as a transmission resource for transmitting the first request. This saves, to some extent, time for requesting an uplink transmission resource by the terminal from the network device by using the first request.

Figure 5:
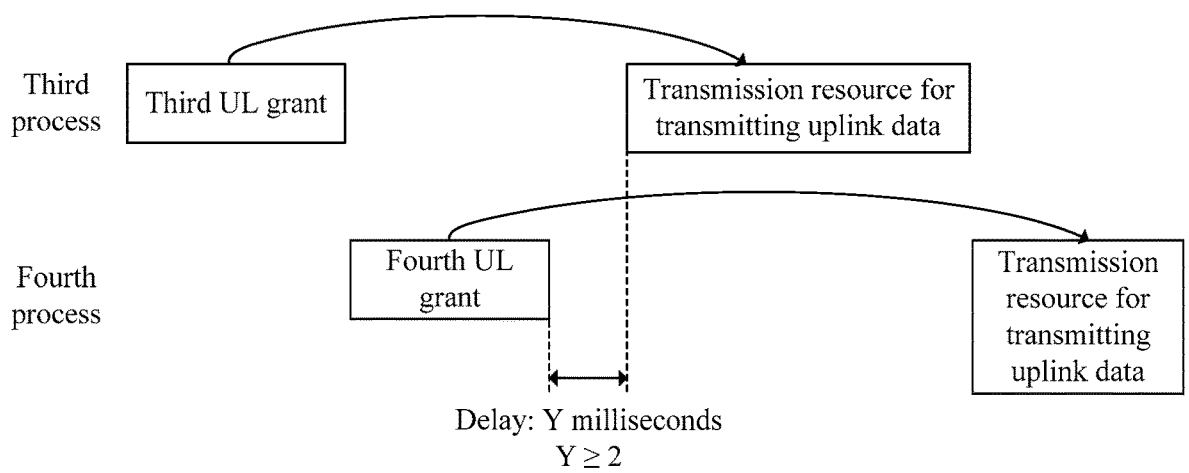
FIG. 5 is a schematic diagram of a method for requesting an uplink transmission resource according to an embodiment of this application.

For example, FIG. 5 is a schematic diagram of a method for requesting an uplink transmission resource according to an embodiment of this application. It can be learned from the method shown in FIG. 5 that a terminal supports sending uplink data to a network device in a third process, and sending uplink data to the network device in a fourth process. When the terminal is performing detection on a search space, if the terminal detects both a third UL grant used to schedule the uplink data transmission in the third process and a fourth UL grant used to schedule the uplink data transmission in the fourth process, the terminal may determine, based on the third UL grant, an uplink transmission resource used to transmit the uplink data in the third process; the terminal may further determine, based on the fourth UL grant, an uplink transmission resource used to transmit the uplink data in the fourth process; and the terminal may select, as a transmission resource for the terminal to send an SR, a transmission resource, with an earlier time, of the uplink transmission resources used to transmit the uplink data in the third process and the fourth process, namely, the transmission resource for transmitting the uplink data in the third process in FIG. 5.

Optionally, the transmission resource used to transmit the to-be-transmitted uplink data in the third process and indicated by the third UL grant is pre-agreed to be used for transmitting the first request.

The terminal and the network device pre-agree that a transmission resource that can be used to transmit the first request is the transmission resource used to transmit the uplink data in the third process. This helps reduce overheads resulting from transmission of the first request.

The foregoing mainly describes the method for requesting an uplink transmission resource in this embodiment of this application when detection on the search space by the terminal collides with indicating the first request by the terminal to the network device. The following mainly describes the method for requesting an uplink transmission resource in this embodiment of this application when sending an NPUSCH by the terminal collides with indicating the first request by the terminal to the network device.

Optionally, in an embodiment, if the terminal determines that the terminal is sending the NPUSCH to the network device when the first request is about to be sent, the adjusting, by the terminal according to a preset rule, a manner of sending the first request includes: sending, by the terminal, the first request to the network device through the NPUSCH.

Specifically, when sending the NPUSCH by the terminal to the network device collides with indicating the first request by the terminal to the network device, the terminal may send the first request to the network device through the NPUSCH.

Optionally, in an embodiment, the terminal determines that the terminal is sending the NPUSCH to the network device when the first request is about to be sent; and the adjusting, by the terminal according to a preset rule, a manner of sending the first request includes: sending, by the terminal, an ACK/a NACK to the network device on a transmission resource in a first resource area or a second resource area, where sending the ACK/NACK on a transmission resource in the first resource area is used to instruct the terminal to send the first request to the network device, or sending the ACK/NACK on a transmission resource in the second resource area is used to instruct the terminal not to send the first request to the network device.

Specifically, that the sending, by the terminal, of the ACK/NACK on a transmission resource in the first resource area is used to instruct the terminal to send the first request to the network device may mean that the terminal needs to transmit to-be-transmitted uplink data and needs to request an uplink transmission resource from the network device; and that the sending the ACK/NACK on a transmission resource in the second resource area is used to instruct the terminal not to send the first request to the network device may mean that the terminal does not need to transmit to-be-transmitted uplink data.

It should be understood that the transmission resource in the first resource area or the second resource area may be a transmission resource used by the terminal to transmit an NPUSCH in a format 2 (Format 2).

The foregoing mainly describes the method for requesting an uplink transmission resource in this embodiment of this application when sending the NPUSCH by the terminal collides with indicating the first request by the terminal to the network device. The following mainly describes the method for requesting an uplink transmission resource in this embodiment of this application when receiving an NPDSCH by the terminal collides with indicating the first request by the terminal to the network device.

Optionally, in an embodiment, if the terminal determines that when the first request is about to be sent, the terminal is receiving the NPDSCH sent by the network device, the adjusting, by the terminal according to a preset rule, a manner of sending the first request includes: receiving, by the terminal in a fifth time period, the NPDSCH sent by the network device; and sending, by the terminal, the first request to the network device in a sixth time period, where the sixth time period is a time period later than the fifth time period.

Optionally, in an embodiment, the sending, by the terminal, the first request to the network device in a sixth time period includes: sending, by the terminal, an ACK/a NACK and the first request to the network device on a ninth transmission resource, where the ninth transmission resource is a transmission resource for transmitting the ACK/NACK used to indicate whether the terminal receives the NPDSCH.

Optionally, in an embodiment, if the terminal supports NPDSCH reception in a fifth process and NPDSCH reception in a sixth process, the receiving, by the terminal in a fifth time period, the NPDSCH sent by the network device includes: receiving, by the terminal in the fifth time period, the NPDSCH transmitted by the network device in the fifth process; and the sending, by the terminal, the first request to the network device in a sixth time period includes: sending, by the terminal, an ACK/a NACK and the first request to the network device on a tenth transmission resource in the sixth time period, where the tenth transmission resource is a transmission resource for transmitting the ACK/NACK used to indicate whether the terminal receives the NPDSCH transmitted in the fifth process.

Optionally, in an embodiment, the transmission resource for the ACK/NACK used to indicate whether the terminal receives the NPDSCH transmitted in the fifth process is used to transmit the first request.

Specifically, the fifth process may be further a process that can be used to transmit the first request and that is pre-agreed by the terminal and the network device. In other words, the first request can be transmitted only on the transmission resource for transmitting the ACK/NACK in the fifth process.

It should be noted that the pre-agreeing by the terminal and the network device may be pre-agreeing by the network device and the terminal by using a protocol, or may be pre-agreeing by the network device and the terminal by using signaling. This is not specifically limited in this embodiment of this application.

The terminal and the network device pre-agree that a transmission resource that can be used to transmit the first request is the transmission resource used to transmit the ACK/NACK in the fifth process. This helps reduce overheads resulting from transmission of the first request.

Optionally, in an embodiment, if the terminal supports NPDSCH reception in a fifth process and NPDSCH reception in a sixth process, the receiving, by the terminal in a fifth time period, the NPDSCH sent by the network device includes: receiving, by the terminal in the fifth time period, the NPDSCH transmitted by the network device in the sixth process; and the sending, by the terminal, the first request to the network device in a sixth time period includes: sending, by the terminal, an ACK/a NACK and the first request to the network device on a target transmission resource for transmitting the ACK/NACK, where the target transmission resource for the ACK/NACK is a transmission resource, with an earlier time-domain location, of a transmission resource for an ACK/a NACK used to indicate whether the terminal receives the NPDSCH in the fifth process and a transmission resource for an ACK/a NACK used to indicate whether the terminal receives the NPDSCH in the sixth process.

Specifically, the terminal may select, from the transmission resource for the ACK/NACK in the fifth process and the transmission resource for the ACK/NACK in the sixth process as the target transmission resource, a transmission resource closest to a time period in which the terminal is to send the first request, and transmit the first request while transmitting the ACK/NACK.

The terminal may select, from the transmission resource for the ACK/NACK in the fifth process and the transmission resource for the ACK/NACK in the sixth process as the target transmission resource, a transmission resource closest to a time period in which the terminal is to send the first request, and transmit the first request while transmitting the ACK/NACK. This saves, to some extent, time for requesting an uplink transmission resource by the terminal from the network device by using the first request.

Optionally, the ACK/NACK and the first request are modulated by using $$\frac{\pi}{4}QPSK.$$

Specifically, when the ACK/NACK and the first request are transmitted on the transmission resource for the ACK/NACK, the ACK/NACK and the first request are modulated by using $$\frac{\pi}{4}QPSK.$$

It should be noted that the terminal may send the ACK/NACK by using the QPSK modulation scheme after requesting an uplink transmission resource from the network device by using a first-request mechanism (for example, by enabling an SR mechanism). In this case, a base station may receive, through QPSK, the ACK/NACK sent by the terminal. This avoids a problem that, after an SR is enabled, the terminal uses the QPSK modulation scheme when an SR and an ACK/a NACK need to be sent and uses a BPSK modulation scheme when only an ACK/a NACK is sent, and as a result, the network device needs to perform blind detection through both BPSK and QPSK. Therefore, detection complexity is reduced for the network device.

The foregoing mainly describes the method for requesting an uplink transmission resource in this embodiment of this application when receiving the NPDSCH by the terminal collides with indicating the first request by the terminal to the network device. The following mainly describes the method for requesting an uplink transmission resource in this embodiment of this application when initiating a random access procedure by the terminal collides with indicating the first request by the terminal to the network device.

Optionally, in an embodiment, the terminal determines that the terminal is sending the random access signal to the network device when the first request is about to be sent; and the adjusting, by the terminal according to a preset rule, a manner of sending the first request includes: sending, by the terminal, the random access signal to the network device in a seventh time period; and sending, by the terminal, the first request to the network device in an eighth time period, where the seventh time period is a time period earlier than the eighth time period, or the seventh time period and the eighth time period are a same time period.

Optionally, the terminal determines that the terminal is sending the random access signal to the network device when the first request is about to be sent; and the adjusting, by the terminal according to a preset rule, a manner of sending the first request includes: sending, by the terminal, the random access signal to the network device, where the random access signal carries the first request.

Optionally, the sending, by the terminal, the random access signal to the network device, where the random access signal carries the first request includes: transmitting the random access signal and the first request through code division multiplexing.

Optionally, in an embodiment, the terminal determines that the terminal is sending the random access signal to the network device when the first request is about to be sent; and the adjusting, by the terminal according to a preset rule, a manner of sending the first request includes: sending, by the terminal, the random access signal to the network device on a transmission resource in a first area or a second area, where sending the random access signal on a transmission resource in the first area is used to instruct the terminal to send the first request to the network device, or sending the random access signal on a transmission resource in the second area is used to instruct the terminal not to send the first request to the network device.

Specifically, that sending the random access signal on a transmission resource in the first area is used to instruct the terminal to send the first request to the network device may mean that the terminal needs to transmit to-be-transmitted uplink data; and that sending the random access signal on a transmission resource in the second area is used to instruct the terminal not to send the first request to the network device may mean that the terminal does not need to transmit to-be-transmitted uplink data.

The terminal sends random access signals to the network device in different areas, to implicitly indicate whether the terminal needs to transmit to-be-transmitted uplink data. This can reduce, to some extent, signaling overheads generated when the terminal sends the first request.

Figure 6:
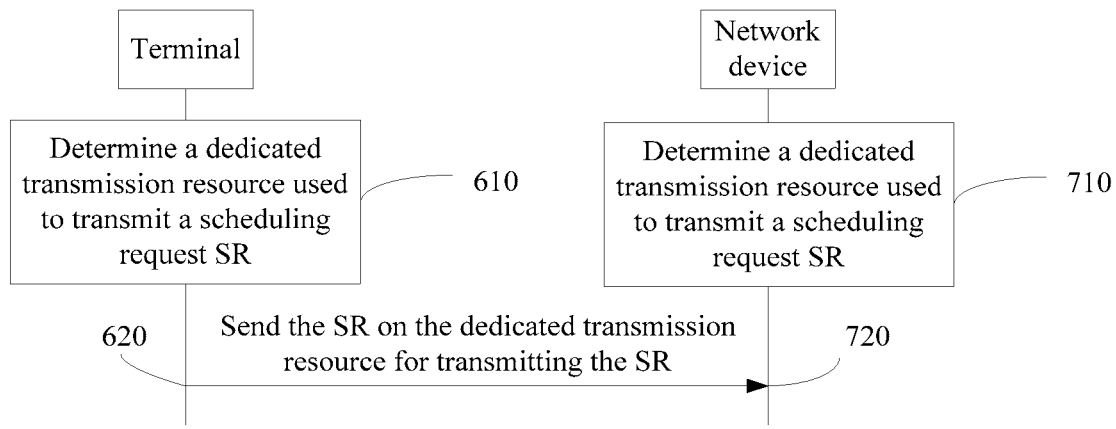
FIG. 6 is a schematic flowchart of a method for requesting an uplink transmission resource according to another embodiment of this application.

To reduce collisions between sending the first request by the terminal and other terminal behaviors to be performed by the terminal, in addition to the foregoing descriptions of the method for requesting an uplink transmission resource in the embodiment of this application with reference to FIG. 3, with reference to FIG. 6, the following describes in detail a method for requesting an uplink transmission resource according to another embodiment of this application.

FIG. 6 is a schematic flowchart of a method for requesting an uplink transmission resource according to another embodiment of this application. The method shown in FIG. 6 includes the following steps.

610. A terminal determines a dedicated transmission resource used to transmit a scheduling request (SR).

Specifically, the dedicated transmission resource may be a transmission resource specially used to transmit the SR. In other words, the SR may not be transmitted on a transmission resource used to transmit other information. For example, the SR may not be transmitted along with an ACK/a NACK on a transmission resource for transmitting the ACK/NACK.

620. The terminal sends the SR to a network device on the dedicated transmission resource.

Specifically, the terminal sends the SR to the network device on the dedicated transmission resource, to request, from the network device, an uplink transmission resource for transmitting to-be-transmitted uplink data.

In this embodiment of this application, the terminal sends the SR to the network device on the dedicated transmission resource used to transmit an SR, to request an uplink transmission resource. This avoids a prior-art problem that a terminal can request an uplink transmission resource from a network device only by initiating a random access procedure, and improves flexibility of requesting an uplink transmission resource by the terminal from the network device.

Further, the terminal sends the SR to the network device to request an uplink transmission resource, so that a delay that occurs when the terminal requests an uplink transmission resource through a random access procedure is reduced to some extent. This prevents the terminal from failing to request an uplink transmission resource due to a failure in initiating a random access procedure by the terminal. This helps improve efficiency of requesting an uplink transmission resource by the terminal.

Finally, the terminal sends the SR to the network device on the dedicated transmission resource used to transmit an SR, to avoid a collision between sending the SR by the terminal to the network device and another terminal behavior to be performed by the terminal.

Optionally, in an embodiment, the method further includes: determining, by the terminal, a target channel coding scheme based on a data volume of to-be-transmitted data; and performing, by the terminal, channel coding on the SR by using the target channel coding scheme.

Optionally, in an embodiment, the target channel coding scheme includes an orthogonal coding scheme, and the performing, by the terminal, channel coding on the SR by using the target channel coding scheme includes: performing, by the terminal, channel coding on the SR by using the orthogonal coding scheme.

Specifically, the performing, by the terminal, channel coding on the SR by using the orthogonal coding scheme may be: transmitting, by the terminal, the SR by using an orthogonal code.

Optionally, in an embodiment, the determining, by the terminal, a target channel coding scheme based on a data volume of to-be-transmitted data includes: determining, by the terminal, a data volume range into which the data volume of to-be-transmitted data falls; and determining, by the terminal, the target channel coding scheme based on the data volume range into which the data volume of to-be-transmitted data falls and a mapping relationship between a data volume range and a channel coding scheme.

The channel coding scheme for the SR is used to indicate a data volume range of a data volume of to-be-transmitted data of the terminal, so that when using the SR to indicate to the network device that the terminal has to-be-transmitted uplink data, the terminal further uses the SR to indicate a data volume range of a data volume of the to-be-transmitted uplink data. This simplifies, to some extent, a procedure of requesting an uplink transmission resource by the terminal.

Optionally, in an embodiment, different data volume ranges correspond to different channel coding schemes in the mapping relationship between a data volume range and a channel coding scheme.

Specifically, different data volume ranges may correspond to different channel coding schemes. The terminal may send, to the network device, an SR obtained through channel coding by using the target channel coding scheme, to indicate to the network device that the terminal needs to transmit to-be-transmitted uplink data. In addition, the terminal may further indicate, to the network device by using the target channel coding scheme, a data volume range into which a data volume of to-be-transmitted data of the terminal falls.

It should be noted that the network device may perform blind detection on the SR to determine the target channel coding scheme used to perform channel coding on the SR.

For example, a BSR is used as a data volume of to-be-transmitted uplink data. The following lists 10 mapping relationships between data volume ranges and channel coding schemes by using Table 1 to Table 10. It should be noted that SRs generated by using different channel coding schemes have different advantages and disadvantages in transmission performance (for example, a coverage range, a false detection rate, and a missed detection rate). Different channel coding schemes may be selected according to signal transmission requirements.

It should be further understood that Table 1 to Table 10 merely show some possible mapping relationships between channel coding schemes and BSR ranges. This is not specifically limited in this embodiment of this application.

TABLE 1

| BSR range | Channel coding scheme |
| --- | --- |
| First data volume range | ZC sequence 1 × Hadamard sequence 1 |
| Second data volume range | ZC sequence 1 × Hadamard sequence 2 |
| Third data volume range | ZC sequence 2 × Hadamard sequence 1 |
| Fourth data volume range | ZC sequence 2 × Hadamard sequence 2 |

In Table 1, different channel coding schemes are formed based on different ZC sequences and different Hadamard (Hadamard) sequences, to correspond to different BSR ranges.

TABLE 2

| BSR range | Channel coding scheme |
| --- | --- |
| First data volume range | ZC sequence 1 × Hadamard sequence 1 |
| Second data volume range | ZC sequence 1 × Hadamard sequence 2 |
| Third data volume range | ZC sequence 1 × Hadamard sequence 3 |
| Fourth data volume range | ZC sequence 1 × Hadamard sequence 4 |

In Table 2, different channel coding schemes are formed based on a same ZC sequence and different Hadamard (Hadamard) sequences, to correspond to different BSR ranges.

TABLE 3

| BSR range | Channel coding scheme |
| --- | --- |
| First data volume range | ZC sequence 1 × Hadamard sequence 1 |
| Second data volume range | ZC sequence 2 × Hadamard sequence 1 |
| Third data volume range | ZC sequence 3 × Hadamard sequence 1 |
| Fourth data volume range | ZC sequence 4 × Hadamard sequence 1 |

In Table 3, different channel coding schemes are formed based on different ZC sequences and a same Hadamard (Hadamard) sequence, to correspond to different BSR ranges.

TABLE 4

| BSR range | Channel coding scheme |
| --- | --- |
| First data volume range | ZC sequence 1 |
| Second data volume range | ZC sequence 2 |
| Third data volume range | ZC sequence 3 |
| Fourth data volume range | ZC sequence 4 |

In Table 4, different channel coding schemes are formed based on different ZC sequences, to correspond to different BSR ranges.

TABLE 5

| BSR range | Channel coding scheme |
| --- | --- |
| First data volume range | Hadamard sequence 1 |
| Second data volume range | Hadamard sequence 2 |
| Third data volume range | Hadamard sequence 3 |
| Fourth data volume range | Hadamard sequence 4 |

In Table 5, different channel coding schemes are formed based on different Hadamard (Hadamard) sequences, to correspond to different BSR ranges.

TABLE 6

| BSR range | Channel coding scheme |
| --- | --- |
| First data volume range | ZC sequence 1 × exp(j * theta1) |
| Second data volume range | ZC sequence 1 × exp(j * theta2) |
| Third data volume range | ZC sequence 2 × exp(j * theta1) |
| Fourth data volume range | ZC sequence 2 × exp(j * theta2) |

In Table 6, phases of ZC sequences are adjusted (for example, the ZC sequence 1×exp(j*theta1) described in Table 6), to generate different ZC sequences. The different ZC sequences correspond to different BSR ranges.

TABLE 7

| BSR range | Channel coding scheme |
| --- | --- |
| First data volume range | ZC sequence 1 × exp(j * theta1) |
| Second data volume range | ZC sequence 1 × exp(j * theta2) |
| Third data volume range | ZC sequence 1 × exp(j * theta3) |
| Fourth data volume range | ZC sequence 1 × exp(j * theta4) |

In Table 7, a phase of a same ZC sequence is adjusted (for example, the ZC sequence 1×exp(j*theta1) described in Table 7), to generate different ZC sequences. The different ZC sequences correspond to different BSR ranges.

TABLE 8

| BSR range | Channel coding scheme |
| --- | --- |
| First data volume range | ZC sequence 1 × Hadamard sequence 1 × exp(j * theta1) |
| Second data volume range | ZC sequence 1 × Hadamard sequence 2 × exp(j * theta2) |
| Third data volume range | ZC sequence 1 × Hadamard sequence 1 × exp(j * theta2) |
| Fourth data volume range | ZC sequence 1 × Hadamard sequence 2 × exp(j * theta1) |
| Fifth data volume range | ZC sequence 2 × Hadamard sequence 1 × exp(j * theta1) |
| Sixth data volume range | ZC sequence 2 × Hadamard sequence 2 × exp(j * theta2) |
| Seventh data volume range | ZC sequence 2 × Hadamard sequence 1 × exp(j * theta2) |
| Eighth data volume range | ZC sequence 2 × Hadamard sequence 2 × exp(j * theta1) |

In Table 8, different channel coding schemes are formed based on different ZC sequences and different Hadamard (Hadamard) sequences and by adjusting phases of the ZC sequences and the Hadamard sequences (for example, the ZC sequence 1×Hadamard sequence 1×exp(j*theta1) described in Table 8), to correspond to different BSR ranges.

TABLE 9

| BSR range | Channel coding scheme |
| --- | --- |
| First data volume range | Hadamard sequence 1 × exp(j * theta1) |
| Second data volume range | Hadamard sequence 1 × exp(j * theta2) |
| Third data volume range | Hadamard sequence 2 × exp(j * theta1) |
| Fourth data volume range | Hadamard sequence 2 × exp(j * theta2) |

In Table 9, phases of different Hadamard sequences are adjusted (for example, the Hadamard sequence 1×exp(j*theta1) described in Table 9), to generate different Hadamard sequences. Different Hadamard sequences correspond to different BSR ranges.

TABLE 10

| BSR range | Channel coding scheme |
| --- | --- |
| First data volume range | Hadamard sequence 1 × exp(j * theta1) |
| Second data volume range | Hadamard sequence 1 × exp(j * theta2) |
| Third data volume range | Hadamard sequence 1 × exp(j * theta3) |
| Fourth data volume range | Hadamard sequence 1 × exp(j * theta4) |

In Table 10, a phase of a same Hadamard sequence is adjusted (for example, the Hadamard sequence 1×exp(j*theta1) described in Table 10), to generate different Hadamard sequences. Different Hadamard sequences correspond to different BSR ranges.

FIG. 6 is a schematic flowchart of a method for requesting an uplink transmission resource according to an embodiment of this application. The method shown in FIG. 6 includes the following steps.

710. A network device determines a dedicated transmission resource used to transmit a scheduling request (SR).

720. The network device receives, on the dedicated transmission resource, the SR sent by the terminal.

Optionally, in an embodiment, the method further includes: determining, by the network device based on a target channel coding scheme for the SR and a mapping relationship between a data volume range and a coding scheme, a data volume range into which a data volume of to-be-transmitted data of the terminal falls.

Optionally, in an embodiment, in the mapping relationship between a data volume range and a coding scheme, different data volume ranges correspond to different coding schemes.

The foregoing describes in detail the method for requesting an uplink transmission resource in the embodiments of this application with reference to FIG. 1 to FIG. 6. The following describes in detail a terminal and a network device in the embodiments of this application with reference to FIG. 7 to FIG. 12. It should be understood that the apparatus shown in FIG. 7 to FIG. 12 can implement the steps in FIG. 1 to FIG. 6. To avoid repetition, details are not described herein again.

Figure 7:
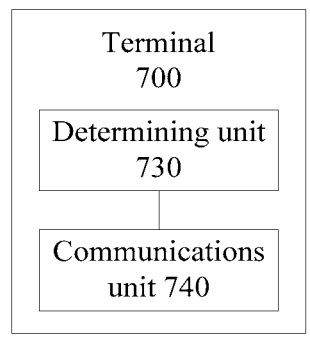
FIG. 7 is a schematic block diagram of a terminal according to an embodiment of this application.

FIG. 7 is a schematic block diagram of a terminal according to an embodiment of this application. The terminal 700 shown in FIG. 7 includes a determining unit 730 and a communications unit 740.

The determining unit is configured to determine that a collision occurs when a first request is sent to a network device, where the first request is used to request the network device to schedule an uplink transmission resource for the terminal.

The communications unit is configured to adjust, according to a preset rule, a manner of sending the first request.

In an optional embodiment, the determining unit 730 may be a processor 820, the communications unit 740 may be a transceiver 840, and the terminal device may further include an input/output interface 830 and a memory 810. Details are shown in FIG. 8.

Figure 8:
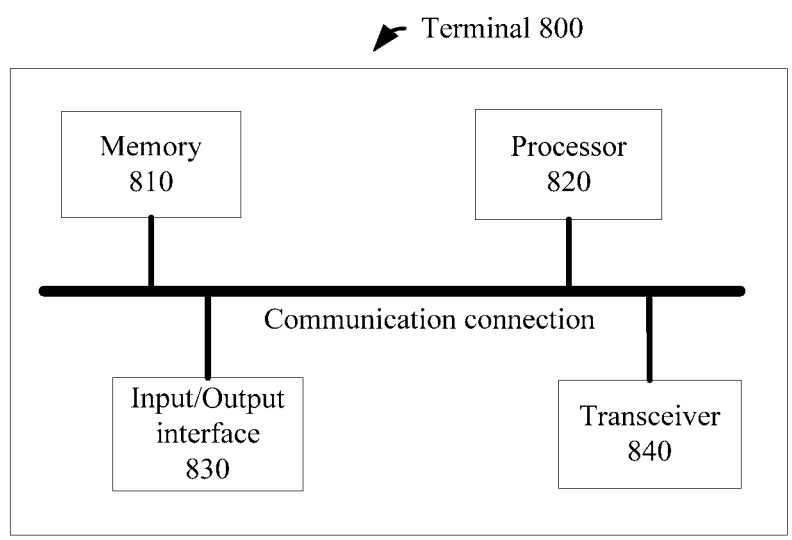
FIG. 8 is a schematic block diagram of a terminal according to another embodiment of this application.

FIG. 8 is a schematic block diagram of a terminal according to another embodiment of this application. The terminal 800 shown in FIG. 8 may include a memory 810, a processor 820, an input/output interface 830, and a transceiver 840. The memory 810, the processor 820, the input/output interface 830, and the transceiver 840 are connected through an internal connection channel. The memory 810 is configured to store an instruction. The processor 820 is configured to execute the instruction stored in the memory 810, to control the input/output interface 830 to receive input data and information and to output data such as an operation result, and control the transceiver 840 to send a signal.

The processor 820 is configured to determine that a collision occurs when a first request is sent to a network device, where the first request is used to request the network device to schedule an uplink transmission resource for the terminal.

The transceiver 840 is configured to adjust, according to a preset rule, a manner of sending the first request.

It should be understood that, in this embodiment of this application, the processor 820 may be a general-purpose central processing unit (central processing unit, CPU), a microprocessor, an application-specific integrated circuit (application-specific integrated circuit, ASIC), or one or more integrated circuits, and is configured to execute a related program to implement the technical solutions provided in the embodiments of this application.

It should be further understood that the transceiver 840 is also referred to as a communications interface, and uses, for example, but not limited to, a transceiver apparatus such as a transceiver device to implement communication between the terminal 800 and another device or a communications network.

The memory 810 may include a read-only memory and a random access memory, and provide an instruction and data to the processor 820. A part of the processor 820 may further include a nonvolatile random access memory. For example, the processor 820 may further store information about a device type.

In an implementation process, the steps of the foregoing method may be performed by using an integrated logic circuit of hardware in the processor 820 or an instruction in a form of software. The method for requesting an uplink transmission resource disclosed with reference to the embodiments of this application may be directly performed by a hardware processor, or may be performed by a combination of hardware in the processor and a software module. The software module may be located in a mature storage medium in the art, for example, a random access memory, a flash memory, a read-only memory, a programmable read-only memory, an electrically erasable programmable memory, or a register. The storage medium is located in the memory 810. The processor 820 reads information from the memory 810, and performs the steps of the foregoing method in combination with hardware of the processor. To avoid repetition, details are not described herein again.

Figure 9:
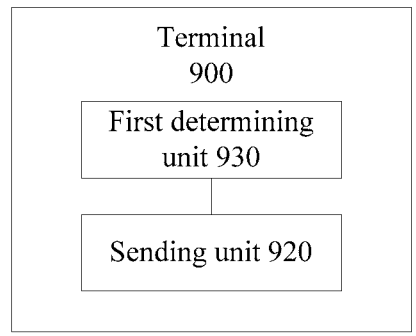
FIG. 9 is a schematic block diagram of a terminal according to an embodiment of this application.

FIG. 9 is a schematic block diagram of a terminal according to an embodiment of this application. The terminal 900 shown in FIG. 9 includes a first determining unit 910 and a sending unit 920.

The first determining unit is configured to determine a dedicated transmission resource used to transmit a scheduling request (SR).

The sending unit is configured to send the SR to a network device on the dedicated transmission resource determined by the first determining unit.

In an optional embodiment, the first determining unit 910 may be a processor 1020, the sending unit 920 may be a transceiver 1040, and the terminal device may further include an input/output interface 1030 and a memory 1010. Details are shown in FIG. 10.

Figure 10:
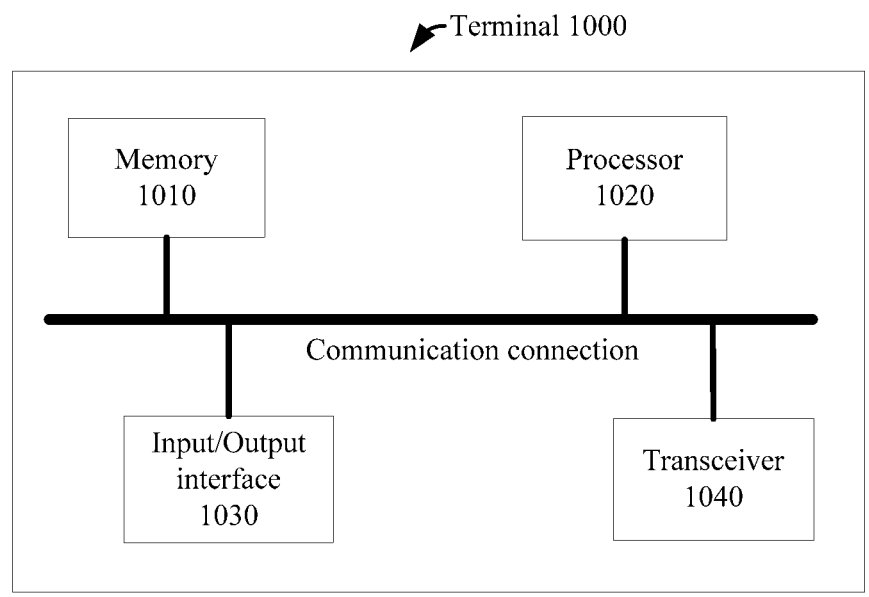
FIG. 10 is a schematic block diagram of a terminal according to another embodiment of this application.

FIG. 10 is a schematic block diagram of a terminal according to another embodiment of this application. The terminal 1000 shown in FIG. 10 may include a memory 1010, a processor 1020, an input/output interface 1030, and a transceiver 1040. The memory 1010, the processor 1020, the input/output interface 1030, and the transceiver 1040 are connected through an internal connection channel. The memory 1010 is configured to store an instruction. The processor 1020 is configured to execute the instruction stored in the memory 1010, to control the input/output interface 1030 to receive input data and information and to output data such as an operation result, and control the transceiver 1040 to send a signal.

The processor 1020 is configured to determine a dedicated transmission resource used to transmit a scheduling request (SR).

The transceiver 1040 is configured to send the SR to a network device on the dedicated transmission resource determined by the processor 1020.

It should be understood that, in this embodiment of this application, the processor 1020 may be a general-purpose central processing unit (Central Processing Unit, CPU), a microprocessor, an application-specific integrated circuit (Application-Specific Integrated Circuit, ASIC), or one or more integrated circuits, and is configured to execute a related program to implement the technical solutions provided in the embodiments of this application.

It should be further understood that the transceiver 1040 is also referred to as a communications interface, and is, for example but not limited to, a transceiver apparatus such as a transceiver device to implement communication between the terminal 1000 and another device or a communications network.

The memory 1010 may include a read-only memory and a random access memory, and provide an instruction and data to the processor 1020. A part of the processor 1020 may further include a nonvolatile random access memory. For example, the processor 1020 may further store information about a device type.

In an implementation process, the steps of the foregoing method may be performed by using an integrated logic circuit of hardware in the processor 1020 or an instruction in a form of software. The method for requesting an uplink transmission resource disclosed with reference to the embodiments of this application may be directly performed by a hardware processor, or may be performed by a combination of hardware in the processor and a software module. The software module may be located in a mature storage medium in the art, for example, a random access memory, a flash memory, a read-only memory, a programmable read-only memory, an electrically erasable programmable memory, or a register. The storage medium is located in the memory 1010. The processor 1020 reads information from the memory 1010, and performs the steps of the foregoing method in combination with hardware of the processor. To avoid repetition, details are not described herein again.

Figure 11:
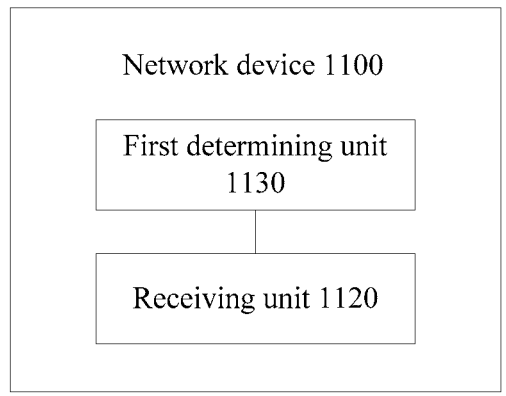
FIG. 11 is a schematic block diagram of a network device according to an embodiment of this application.

FIG. 11 is a schematic block diagram of a network device according to an embodiment of this application. The network device 1100 shown in FIG. 11 includes a first determining unit 1110 and a receiving unit 1120.

The first determining unit is configured to determine a dedicated transmission resource used to transmit a scheduling request (SR).

The receiving unit is configured to receive, on the dedicated transmission resource determined by the first determining unit, the SR sent by the terminal.

In an optional embodiment, the first determining unit 1110 may be a processor 1220, the receiving unit 1120 may be a transceiver 1240, and the terminal device may further include an input/output interface 1230 and a memory 1210. Details are shown in FIG. 12.

Figure 12:
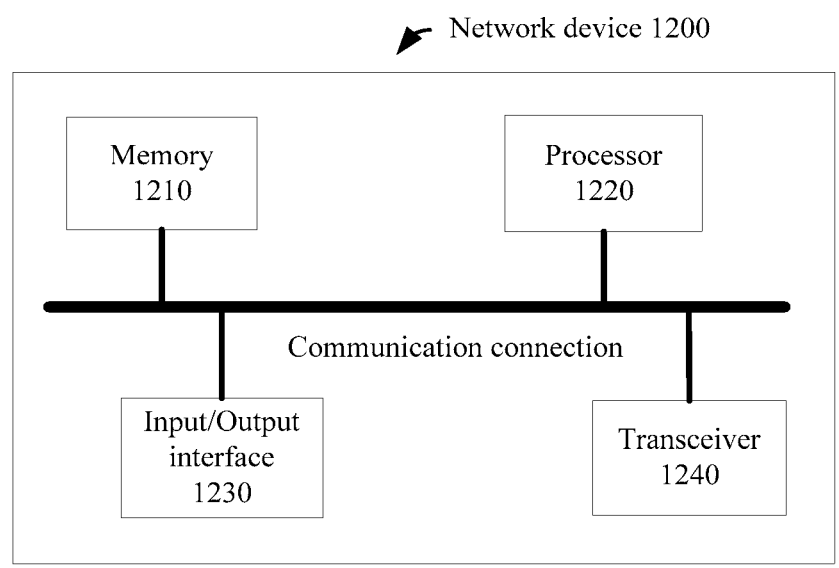
FIG. 12 is a schematic block diagram of a network device according to another embodiment of this application.

FIG. 12 is a schematic block diagram of a network device according to another embodiment of this application. The network device 1200 shown in FIG. 12 may include a memory 1210, a processor 1220, an input/output interface 1230, and a transceiver 1240. The memory 1210, the processor 1220, the input/output interface 1230, and the transceiver 1240 are connected through an internal connection channel. The memory 1210 is configured to store an instruction. The processor 1220 is configured to execute the instruction stored in the memory 1210, to control the input/output interface 1230 to receive input data and information and to output data such as an operation result, and control the transceiver 1240 to send a signal.

The processor 1220 is configured to determine that a to-be-performed first terminal behavior collides with a to-be-performed second terminal behavior. The first terminal behavior is requesting an uplink transmission resource by indicating a scheduling request (SR) and/or a buffer status report (BSR) to the network device.

The transceiver 1240 is configured to perform the to-be-performed second terminal behavior and indicate the SR and/or the BSR to the network device according to a preset rule. The preset rule is used to indicate a time sequence for performing the first terminal behavior and the second terminal behavior by the terminal.

It should be understood that, in this embodiment of this application, the processor 1220 may be a general-purpose central processing unit (Central Processing Unit, CPU), a microprocessor, an application-specific integrated circuit (Application-Specific Integrated Circuit, ASIC), or one or more integrated circuits, and is configured to execute a related program to implement the technical solutions provided in the embodiments of this application.

It should be further understood that the transceiver 1240 is also referred to as a communications interface, and is, for example but not limited to, a transceiver apparatus such as a transceiver device to implement communication between the terminal 1200 and another device or a communications network.

The memory 1210 may include a read-only memory and a random access memory, and provide an instruction and data to the processor 1220. A part of the processor 1220 may further include a nonvolatile random access memory. For example, the processor 1220 may further store information about a device type.

In an implementation process, the steps of the foregoing method may be performed by using an integrated logic circuit of hardware in the processor 1220 or an instruction in a form of software. The method for requesting an uplink transmission resource disclosed with reference to the embodiments of this application may be directly performed by a hardware processor, or may be performed by a combination of hardware in the processor and a software module. The software module may be located in a mature storage medium in the art, for example, a random access memory, a flash memory, a read-only memory, a programmable read-only memory, an electrically erasable programmable memory, or a register. The storage medium is located in the memory 1210. The processor 1220 reads information from the memory 1210, and performs the steps of the foregoing method in combination with hardware of the processor. To avoid repetition, details are not described herein again.

Optionally, in an embodiment, a baseband processor is coupled to a transceiver. The baseband processor is configured to determine that a collision occurs when a first request is sent to a network device, where the first request is used to request the network device to schedule an uplink transmission resource for the terminal. The transceiver is configured to adjust, according to a preset rule, a manner of sending the first request. The baseband processor may control the transceiver to perform the method shown in FIG. 2.

It should be understood that, in this embodiment of this application, the baseband processor may be a general-purpose central processing unit (central processing unit, CPU), a microprocessor, an application-specific integrated circuit (application-specific integrated circuit, ASIC), or one or more integrated circuits, and is configured to execute a related program to implement the technical solutions provided in the embodiments of this application.

It should be further understood that the baseband processor may be disposed on a terminal.

Optionally, in an embodiment, a baseband processor is coupled to a transceiver. The baseband processor is configured to determine a dedicated transmission resource used to transmit a scheduling request (SR). The transceiver is configured to send the scheduling request (SR) to a network device on the dedicated transmission resource determined by the processor. The baseband processor may control the transceiver to perform the method shown in FIG. 6.

It should be understood that, in this embodiment of this application, the baseband processor may be a general-purpose central processing unit (central processing unit, CPU), a microprocessor, an application-specific integrated circuit (application-specific integrated circuit, ASIC), or one or more integrated circuits, and is configured to execute a related program to implement the technical solutions provided in the embodiments of this application.

It should be further understood that the baseband processor may be disposed on a terminal.

It should be understood that in the embodiments of this application, "B corresponding to A" indicates that B is associated with A, and B may be determined based on A. However, it should be further understood that determining A based on B does not mean that B is determined based on A only; that is, B may also be determined based on A and/or other information.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separated, and parts shown as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units may be integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, all or some of the procedures or functions according to the embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a digital versatile disc (digital versatile disc, DVD)), or a semiconductor medium (for example, a solid-state drive (solid state drive, SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for requesting an uplink transmission resource, wherein the method comprises:
   determining, by a terminal, that the terminal is performing detection on a search space when the terminal sends a first request to a network device, wherein the first request is used to request the network device to schedule an uplink transmission resource for the terminal; and
   adjusting, by the terminal and according to a preset rule, a manner of sending the first request, wherein the adjusting, by the terminal and according to a preset rule, a manner of sending the first request comprises:
      performing, by the terminal, detection on the search space in a first time period; and
      sending, by the terminal, the first request to the network device in a second time period, wherein the first time period is a time period earlier than the second time period.

2. The method according to claim 1, wherein the first request is a scheduling request (SR) or a buffer status report (BSR).

3. The method according to claim 1, the performing, by the terminal, detection on the search space comprises any one of the following cases:
   detecting, by the terminal, a downlink grant (DL grant) in the search space;
   detecting, by the terminal, no control information in the search space; or
   detecting, by the terminal, an uplink grant (UL grant) in the search space.

4. The method according to claim 1, wherein the performing, by the terminal, detection on the search space in a first time period comprises:
   detecting, by the terminal, a downlink grant (DL grant) in the search space in the first time period; and
   wherein the sending, by the terminal, the first request to the network device in a second time period comprises:
      sending, by the terminal, an acknowledgment (ACK)/a negative acknowledgement (NACK) and the first request to the network device on a first transmission resource in the second time period, wherein the first transmission resource is a transmission resource that is used to transmit the ACK/NACK and that is indicated by the DL grant.

5. The method according to claim 1, wherein if: the terminal supports downlink data transmission in a first process and downlink data transmission in a second process, a first DL grant is used to schedule the downlink data transmission in the first process, and a second DL grant is used to schedule the downlink data transmission in the second process,
   the performing, by the terminal, detection on the search space in a first time period comprises:
      detecting, by the terminal, the first DL grant and the second DL grant in the search space in the first time period;
   the sending, by the terminal, the first request to the network device in a second time period comprises:
      sending, by the terminal, an ACK/a NACK and the first request to the network device on a second transmission resource in the second time period, wherein the second transmission resource is a transmission resource that is used to transmit the ACK/NACK in the first process and that is indicated by the first DL grant; and the method further comprises:
: sending, by the terminal, an ACK/a NACK and the first request to the network device on a third transmission resource in a third time period, wherein the third transmission resource is a transmission resource that is used to transmit the ACK/NACK in the second process and that is indicated by the second DL grant, and wherein the third time period is a time period later than the first time period.

6. The method according to claim 1, wherein if: the terminal supports downlink data transmission in a third process and downlink data transmission in a fourth process, a third DL grant is used to schedule the downlink data transmission in the third process, and a fourth DL grant is used to schedule the downlink data transmission in the fourth process,
: the performing, by the terminal, detection on the search space in a first time period comprises:
: : detecting, by the terminal, the third DL grant in the search space in the first time period; and
: the sending, by the terminal, the first request to the network device in a second time period comprises:
: : sending, by the terminal, an ACK/a NACK and the first request to the network device on a fourth transmission resource in the second time period, wherein the fourth transmission resource is a transmission resource that is used to transmit the ACK/NACK in the third process and that is indicated by the third DL grant.

7. The method according to claim 6, wherein the transmission resource used to transmit the ACK/NACK in the third process and indicated by the third DL grant is pre-agreed to be used for transmitting the first request.

8. A terminal, comprising:
: at least one processor;
: a memory storing instructions executable by the at least one processor, wherein the instructions, when executed by the at least one processor, instruct the at least one processor to determine that the terminal is performing detection on a search space when a first request sent to a network device, wherein the first request is used to request the network device to schedule an uplink transmission resource for the terminal;
: perform detection on the search space in a first time period; and
: send the first request to the network device in a second time period, wherein the second time period is later than the first time period.

9. The terminal according to claim 8, wherein the first request is a scheduling request (SR) or a buffer status report (BSR).

10. The terminal according to claim 8, wherein the first time period is a time period earlier than the second time period, and wherein the instructions further instruct the at least one processor to:
: detect a downlink grant (DL grant) in the search space;
: detect no control information in the search space; or
: detect an uplink grant (UL grant) in the search space.

11. The terminal according to claim 8, wherein the instructions further instruct the at least one processor red to:
: detect a downlink grant (DL grant) in the search space in the first time period; and
: wherein the sending the first request to the network device in a second time period comprises:
: : sending an acknowledgment (ACK)/a negative acknowledgement (NACK) and the first request to the network device on a first transmission resource in the second time period, wherein the first transmission resource is a transmission resource that is used to transmit the ACK/NACK and that is indicated by the DL grant.

12. The terminal according to claim 8, wherein if: the terminal supports downlink data transmission in a first process and downlink data transmission in a second process, a first DL grant is used to schedule the downlink data transmission in the first process, and a second DL grant is used to schedule the downlink data transmission in the second process,
: the instructions further instruct the at least one processor to:
: : detect the first DL grant and the second DL grant in the search space in the first time period;
: : send an ACK/a NACK and the first request to the network device on a second transmission resource in the second time period, wherein the second transmission resource is a transmission resource that is used to transmit the ACK/NACK in the first process and that is indicated by the first DL grant; and
: : send an ACK/a NACK and the first request to the network device on a third transmission resource in a third time period, wherein the third transmission resource is a transmission resource that is used to transmit the ACK/NACK in the second process and that is indicated by the second DL grant, and wherein the third time period is a time period later than the first time period.

13. The terminal according to claim 8, wherein if: the terminal supports downlink data transmission in a third process and downlink data transmission in a fourth process, a third DL grant is used to schedule the downlink data transmission in the third process, and a fourth DL grant is used to schedule the downlink data transmission in the fourth process,
: the instructions further instruct the at least one processor to:
: : detect the third DL grant in the search space in the first time period; and
: : send an ACK/a NACK and the first request to the network device on a fourth transmission resource in the second time period, wherein the fourth transmission resource is a transmission resource that is used to transmit the ACK/NACK in the third process and that is indicated by the third DL grant.

14. The terminal according to claim 13, wherein the transmission resource used to transmit the ACK/NACK in the third process and indicated by the third DL grant is pre-agreed to be used for transmitting the first request.

* * * * *